US010599337B2

(12) United States Patent
Yang et al.

(10) Patent No.: US 10,599,337 B2
(45) Date of Patent: Mar. 24, 2020

(54) METHOD AND DEVICE FOR WRITING DATA AND ACQUIRING DATA IN A DISTRIBUTED STORAGE SYSTEM

(71) Applicant: ALIBABA GROUP HOLDING LIMITED, George Town, Grand Cayman (KY)

(72) Inventors: Ming Yang, Hangzhou (CN); Wenzhao Li, Hangzhou (CN); Zhongyu Zou, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/916,192

(22) Filed: Mar. 8, 2018

(65) Prior Publication Data

US 2018/0203606 A1 Jul. 19, 2018

Related U.S. Application Data

(63) Continuation of application No. PCT/CN2016/097498, filed on Aug. 31, 2016.

(30) Foreign Application Priority Data

Sep. 9, 2015 (CN) .......................... 2015 1 0571183

(51) Int. Cl.
*G06F 3/06* (2006.01)
*G06F 16/182* (2019.01)
(52) U.S. Cl.
CPC .............. *G06F 3/061* (2013.01); *G06F 3/067* (2013.01); *G06F 3/0619* (2013.01);
(Continued)
(58) Field of Classification Search
CPC ...... G06F 3/061; G06F 3/0643; G06F 3/0619; G06F 3/0655; G06F 3/067; G06F 16/182
See application file for complete search history.

(56) References Cited

U.S. PATENT DOCUMENTS

| 7,107,419 | B1 | 9/2006 | Ghemawat et al. |
| 2012/0102281 | A1 | 4/2012 | Moon et al. |

(Continued)

FOREIGN PATENT DOCUMENTS

| CN | 102156700 A | 8/2011 |
| CN | 102307221 A | 1/2012 |

(Continued)

OTHER PUBLICATIONS

First Search Report issued in corresponding International Application No. 201510571183.7 (2 pg.).

(Continued)

*Primary Examiner* — Aracelis Ruiz
(74) *Attorney, Agent, or Firm* — Finnegan, Henderson, Farabow, Garrett & Dunner LLP

(57) ABSTRACT

The present application provides methods and devices for writing data and acquiring data in a distributed storage system. According to an exemplary method, in a process of writing data, a data file is not overwritten but is instead updated by making a copy in a newly allocated storage block and an updated description file is persisted by using an atomic operation. This way, in a process of appending data, it can be ensured that a data file is not damaged, and the readability and consistency of data are maintained, facilitating the use by a user. Further, writing data according to some embodiments of the present application supports a write in which a user specifies a write position of to-be-written data, and also supports a write in which the user does not specify a write position of to-be-written data, thereby improving the flexibility of writing data.

26 Claims, 12 Drawing Sheets

(52) U.S. Cl.
CPC .......... *G06F 3/0643* (2013.01); *G06F 3/0655* (2013.01); *G06F 16/182* (2019.01)

(56) References Cited

U.S. PATENT DOCUMENTS

2014/0281220 A1* 9/2014 Noguchi ............... G06F 3/0689
　　　　　　　　　　　　　　　　　　　　　711/114
2015/0149725 A1　　5/2015 Mathur et al.

FOREIGN PATENT DOCUMENTS

| CN | 102541869 A | 7/2012 |
| CN | 102622350 A | 8/2012 |
| CN | 103136215 A | 6/2013 |
| CN | 103970844 A | 8/2014 |
| CN | 104731921 A | 6/2015 |

OTHER PUBLICATIONS

First Office Action issued by the State Intellectual Property Office of People's Republic of China in corresponding Chinese Application No. 201510571183.7; dated Jan. 31, 2019 (10 pgs.).
International Preliminary Report on Patentability, International Written Opinion and International Search Report issued in related PCT Application No. PCT/CN2016/097498; dated Nov. 28, 2016 (18 pgs.).

\* cited by examiner

METHOD AND DEVICE FOR WRITING DATA AND ACQUIRING DATA IN A DISTRIBUTED STORAGE SYSTEM

CROSS REFERENCE TO RELATED APPLICATION

This present application claims priority to International Application No. PCT/CN2016/097498, filed on Aug. 31, 2016, and claims priority to Chinese Patent Application No. 201510571183.7, filed on Sep. 9, 2015, both of which are incorporated herein by reference in their entireties.

TECHNICAL FIELD

The present application relates to the field of computer technology, and in particular, to methods and devices for writing data and acquiring data in a distributed storage system.

BACKGROUND

In a cloud storage system, a user may be limited by the network environment or the particular application features. Consequently, the user may need to perform multiple write operations to complete the writing of one data file. For example, when writing a large data file, a user usually needs to use append write mode. In a distributed cloud storage system, problems such as concurrent writes of a user and issues regarding data integrity need to be addressed, in order to support append write mode. Therefore, there is a need for techniques on how to support append write mode for a data file in a cloud storage system.

SUMMARY

Embodiments of the present application provide methods and devices for writing data in append mode and acquiring data in a distributed cloud storage system, for example, for appending to-be-written data when a user specifies an append position and when a user does not specify an append position, and reading data.

According to some embodiments of the present application, methods for writing data in a distributed storage system. One exemplary method comprises: acquiring to-be-written data of a user, and storing the to-be-written data in a newly allocated data storage block; generating data start-end information about the data storage block, updating a primary start-end information list based on the data start-end information, and storing the updated primary start-end information list in a newly allocated primary start-end information storage block; generating a primary identification code based on the primary start-end information storage block; and updating a description file based on the primary identification code and a total length of a data file obtained after the to-be-written data is added, and persisting the updated description file by using an atomic operation.

According to some embodiments of the present application, the acquiring to-be-written data of a user, and storing the to-be-written data in a newly allocated data storage block further comprises: determining whether a size of previous data stored in a data storage block allocated the last time before the to-be-written data is acquired is less than a preset capacity, and when the size is less than the preset capacity, performing a penalty reading operation, which includes: combining the previous data and the to-be-written data and storing the combined data in the newly allocated data storage block.

According to some embodiments of the present application, with respect to writing data for which a user specifies an append position, the method can further include: acquiring a requested position of the to-be-written data before the to-be-written data is acquired, determining whether the requested position is consistent with a total length of a current data file, and acquiring the to-be-written data when the requested position is consistent with the total length.

According to some embodiments of the present application, with respect to writing data for which a user does not specify an append position, the method can further include: acquiring a file length of the data file before the to-be-written data is acquired; and the updating a description file based on the primary identification code and a total length of a data file obtained after the to-be-written data is added, and persisting the updated description file by using an atomic operation can further include: using the file length of the data file before the to-be-written data is acquired as a requested position of the to-be-written data to determine whether the requested position is consistent with a total length of a current data file; and when the requested position is consistent with the total length, updating the description file based on the primary identification code and the total length of the data file obtained after the to-be-written data is added, and persisting the updated description file by using the atomic operation.

According to some embodiments of the present application, with respect to writing data for which a user does not specify an append position, the acquiring to-be-written data of a user, and storing the to-be-written data in a newly allocated data storage block can further include: when the requested position is inconsistent with the total length of the current data file, determining whether the penalty reading operation exists in the storing the to-be-written data in the newly allocated data storage block.

If the penalty reading operation exists, redetermining whether the size of the previous data stored in the data storage block allocated the last time before the to-be-written data is acquired is less than the preset capacity; when the size is less than the preset capacity, reperforming the penalty reading operation, which includes: combining the previous data and the to-be-written data and storing the combined data in the newly allocated data storage block again, and updating, in the primary start-end information list, start-end information generated based on the data storage block; when the size is greater than or equal to the preset capacity, writing and storing the to-be-written data in the newly data storage block, and updating, in the primary start-end information list, start-end information generated based on the data storage block.

If the penalty reading operation does not exist, reacquiring the total length of the data file, using the reacquired file length of the data file as the requested position of the to-be-written data to redetermine whether the requested position is consistent with the total length of the current data file; when the requested position is consistent with the total length, updating the description file based on the primary identification code and the total length of the data file obtained after the to-be-written data is added, and persisting the updated description file by using the atomic operation.

According to some embodiments of the present application, the method can further include: determining whether a capacity of the primary start-end information list reaches a capacity threshold or whether a quantity of data start-end information thereof reaches a quantity threshold; and when the capacity reaches the capacity threshold or the quantity reaches the quantity threshold: transferring all data start-end information that are currently in the primary start-end information list to a secondary start-end information list and storing the secondary start-end information list in a newly allocated secondary start-end information storage block, and storing secondary start-end information generated based on the secondary start-end information storage block in the primary start-end information storage block.

According to some embodiments of the present application, the method can further include: setting a primary start-end information storage block corresponding to the primary start-end information list before the update to a read-only state; and after the description file is successfully persisted, clearing the primary start-end information storage block corresponding to the primary start-end information list before the update.

According to some embodiments of the present application, each data storage block can include one or multiple unit storage blocks. The multiple unit storage blocks can have the same capacity.

According to some embodiments of the present application, the data start-end information can include at one or more of the following: an identification code of the data storage block; start-end address information of data in the data storage block; and a number of unit storage blocks in the data storage block.

According to some embodiments of the present application, methods for acquiring data in a distributed storage system are provided. One exemplary method comprises: acquiring a description file; acquiring, based on a primary identification code in the description file, a primary start-end information list from a primary start-end information storage block corresponding to the primary identification code; searching the primary start-end information list for corresponding data start-end information; and reading, based on the data start-end information, corresponding data from a data storage block corresponding to the data start-end information.

According to some embodiments of the present application, when the primary start-end information list further includes secondary start-end information, the searching the primary start-end information list for corresponding data start-end information can further include: searching, based on the secondary start-end information, a secondary start-end information storage block corresponding to the secondary start-end information for the corresponding data start-end information.

According to some embodiments of the present application, the searching the primary start-end information list for corresponding data start-end information can further include: searching for the corresponding data start-end information by using binary search.

According to some embodiments of the present application, devices for writing data in a distributed storage system are provided. One exemplary device comprises: a writing apparatus configured to acquire to-be-written data of a user, and store the to-be-written data in a newly allocated data storage block; a start-end information update apparatus configured to generate data start-end information about the data storage block, update a primary start-end information list based on the data start-end information, and store the updated primary start-end information list in a newly allocated primary start-end information storage block; a primary identification code update apparatus configured to generate a primary identification code based on the primary start-end information storage block; and a description file update apparatus configured to update a description file based on the primary identification code and a total length of a data file obtained after the to-be-written data is added, and persist the updated description file by using an atomic operation.

According to some embodiments of the present application, the device can further include: a determination apparatus configured to acquire a requested position of the to-be-written data before the to-be-written data is acquired, determine whether the requested position is consistent with a total length of a current data file, and acquire the to-be-written data when the requested position is consistent with the total length.

According to some embodiments of the present application, the writing apparatus can include: a penalty reading unit configured to determine whether a size of previous data stored in a data storage block allocated the last time before the to-be-written data is acquired is less than a preset capacity, and when the size is less than the preset capacity, perform a penalty reading operation, which includes: combining the previous data and the to-be-written data and storing the combined data in the newly allocated data storage block.

According to some embodiments of the present application of the present application, with respect to writing data for which a user does not specify an append position, the writing apparatus can be further configured to acquire a file length of the data file before the to-be-written data is acquired. The description file update apparatus can be further configured to use the file length of the data file before the to-be-written data is acquired as a requested position of the to-be-written data, to determine whether the requested position is consistent with a total length of a current data file. When the requested position is consistent with the total length, the description file update apparatus is further configured to update the description file based on the primary identification code and the total length of the data file obtained after the to-be-written data is added, and persist the updated description file by using the atomic operation.

Further, with respect to writing data for which a user does not specify an append position, the description file update apparatus can be further configured to: when the requested position is inconsistent with the total length of the current data file, determine whether the penalty reading operation exists in the storing the to-be-written data in the newly allocated data storage block.

If the penalty reading operation exists, the description file update apparatus can be further configured to redetermine whether the size of the previous data stored in the data storage block allocated the last time before the to-be-written data is acquired is less than the preset capacity. When the size is less than the preset capacity, the description file update apparatus can be further configured to reperform the penalty reading operation, which includes: combining the previous data and the to-be-written data and storing the combined data in the data storage block again, and update, in the primary start-end information list, start-end information generated based on the data storage block. When the size is greater than or equal to the preset capacity, the description file update apparatus can be further configured to write and store the to-be-written data in the newly allocated the data storage block again, and update, in the primary start-end information list, start-end information generated based on the data storage block.

If the penalty reading operation does not exist, the description file update apparatus can be further configured to the reacquire the total length of the data file, use the reacquired file length of the data file as the requested position of the to-be-written data to redetermine whether the requested position is consistent with the total length of the current data file. When the requested position is consistent with the total length, the description file update apparatus can be further configured to update the description file based on the primary identification code and the total length of the data file obtained after the to-be-written data is added, and persist the updated description file by using the atomic operation.

According to some embodiments of the present application, the device can further include: a grading apparatus configured to determine whether a capacity of the primary start-end information list reaches a capacity threshold or whether a quantity of data start-end information thereof reaches a quantity threshold. When the capacity reaches the capacity threshold or the quantity reaches the quantity threshold, the grading apparatus can be further configured to transfer all data start-end information that are currently in the primary start-end information list to a secondary start-end information list, store the secondary start-end information list in a newly allocated secondary start-end information storage block, and store secondary start-end information generated based on the secondary start-end information storage block in the primary start-end information storage block.

According to some embodiments of the present application, the device can further include: a buffer apparatus configured to set a primary start-end information storage block corresponding to the primary start-end information list before update to a read-only state, and after the description file is successfully persisted, clear the primary start-end information storage block corresponding to the primary start-end information list before update.

According to some embodiments of the present application, each data storage block can include one or multiple unit storage blocks. The multiple unit storage blocks can have the same capacity.

According to some embodiments of the present application, the data start-end information can include one or more of the following: an identification code of the data storage block; start-end address information of data in the data storage block; and a number of unit storage blocks in the data storage block.

According to some embodiments of the present application, devices for acquiring data in a distributed storage system are provided. One exemplary devices comprises:

a description file acquisition apparatus configured to acquire a description file;

a primary start-end information list acquisition apparatus configured to acquire, based on a primary identification code in the description file, a primary start-end information list from a primary start-end information storage block corresponding to the primary identification code; a data start-end information acquisition apparatus configured to search the primary start-end information list for corresponding data start-end information; and a data acquisition apparatus configured to read, based on the data start-end information, corresponding data from a data storage block corresponding to the data start-end information.

According to some embodiments of the present application, when the primary start-end information list includes secondary start-end information, the data start-end information acquisition apparatus can be further configured to: search, based on the secondary start-end information, a secondary start-end information storage block corresponding to the secondary start-end information for the corresponding data start-end information.

According to some embodiments of the present application, the data start-end information acquisition apparatus can be further configured to search for the corresponding data start-end information by using binary search.

Embodiments of the present application provide methods and devices for writing data and acquiring data in a distributed storage system. One exemplary method for writing data comprises: acquiring to-be-written data of a user, and storing the to-be-written data in a newly allocated data storage block; generating data start-end information about the data storage block, updating a primary start-end information list based on the data start-end information, and storing the updated primary start-end information list in a newly allocated primary start-end information storage block; generating a primary identification code based on the primary start-end information storage block; and updating a description file based on the primary identification code and a total length of a data file obtained after the to-be-written data is added, and persisting the updated description file by using an atomic operation.

According to the above exemplary embodiments of the present application, a data file is not overwritten but is instead updated by copying to in a newly allocated storage block and the updated description file is persisted by using the atomic operation. That way, in a process of appending data, it can be ensured that a data file is not damaged. The readability and consistency of data are maintained, thereby facilitating the use by a user. Further, embodiments of the present application support writing where a user specifies a write position of to-be-written data, and also supports writing where the user does not specify a write position of to-be-written data, thereby improving the flexibility of writing data by the user.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods according to some embodiments of the present disclosure, the scope of which is defined by the appended claims.

In a cloud storage system, the following techniques are often used to implement an append operation. Before a first-time upload, a user divides an entire data file into multiple data blocks (or parts). One unique identifier is assigned to each part. These unique identifiers are referred to as PartId, for example: Part 1, Part 2, Part 3, . . . . When uploading a data block, the user is required to specify a PartId to perform an operation. A part can be uniquely indexed by using a PartId. A part corresponding to each PartId is stored as a separate data file. A write operation on the PartId overwrites an existing data file of a part. After the parts corresponding to all PartIds are successfully written, the user performs a commit operation to specify which PartIds are combined in what order to form one data file. By means of the commit operation, some PartIds may be discarded or some PartIds may repeatedly appear. Corresponding parts are combined according to a specified order or discarded. During the commit operation, the data file is invisible to the user. The user cannot perform a read operation on the data file in which a portion of the data is written.

After the commit operation, the entire data file becomes visible. However, the user can no longer write a new part or rewrite a part. If uploading of one part fails, the user needs to rewrite the entire part and cannot append data to the part. In addition, the user needs to divide the entire data file in advance. In cases where the user does not know the size of a data file in advance, each part may be excessively small and the number of parts may be excessively large, or a single part is excessively large. As a result, the probability of write failure may increase.

According to anther technique, the cloud storage system supports a method for logically combining multiple small data files into one large data file. The user uploads multiple small data files and updates a metadata file. The metadata file represents a large data file that the user wants eventually, and includes a list of all the small data files. The small data files and the combined data file have a loose relationship, and therefore it cannot be ensured that a small data file is not deleted or changed. As a result, the integrity of the combined data file is not ensured, thereby compromising data integrity.

Figure 1:
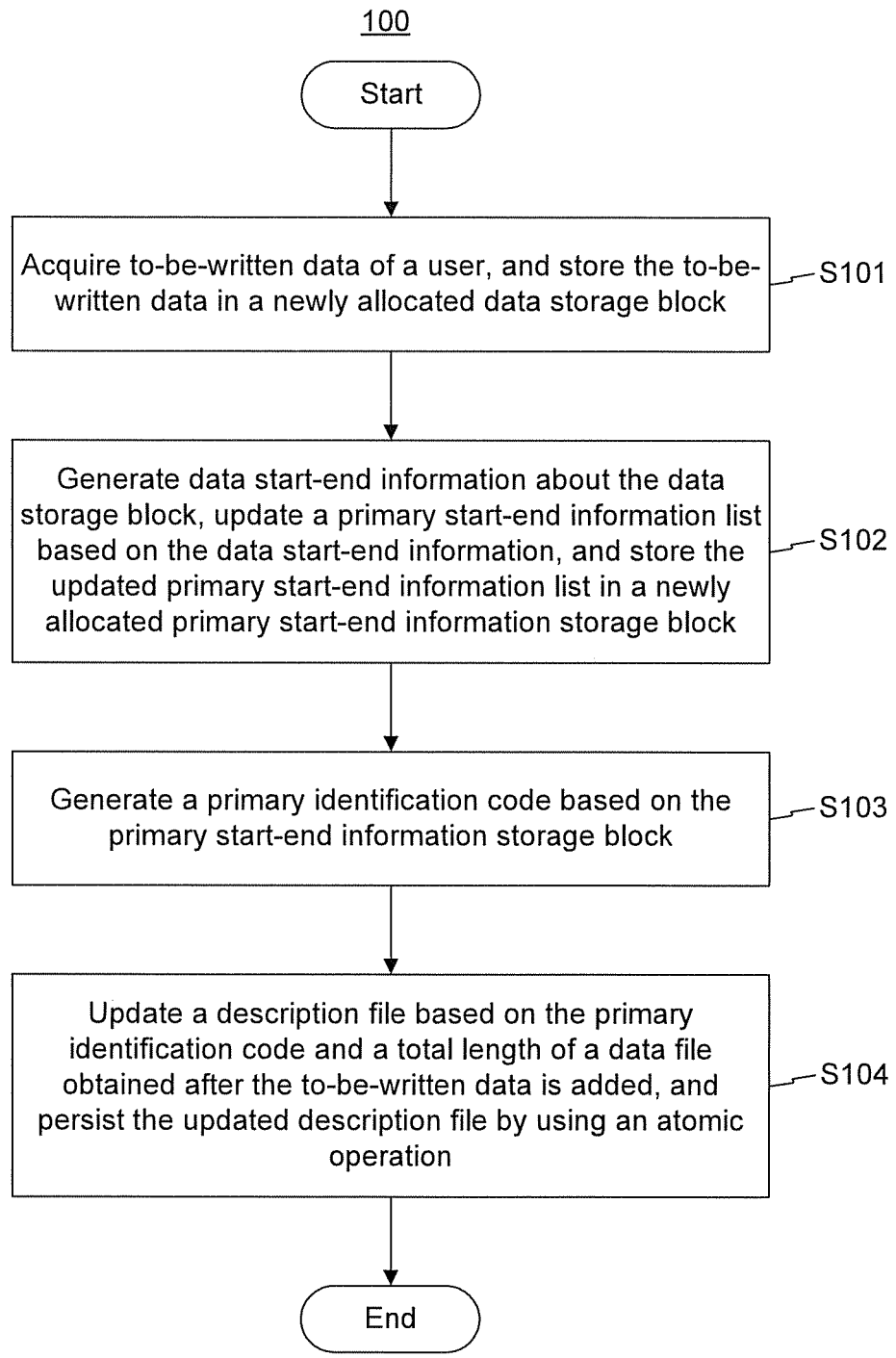
FIG. 1 is a flow chart of an exemplary method for writing data in a distributed storage system according to some embodiments of the present application.

In view of the above problems, FIG. 1 shows an exemplary method 100 for writing data in a distributed storage system according to some embodiments of the present application. The exemplary method 100 includes at least steps S101-S104 as further described below.

In step S101, to-be-written data of a user is acquired, and the to-be-written data is stored in a newly allocated data storage block.

In step S102, data start-end information about the data storage block is generated, a primary start-end information list is updated based on the data start-end information, and the updated primary start-end information list is stored in a newly allocated primary start-end information storage block.

In step S103, a primary identification code is generated based on the primary start-end information storage block.

In step S104, a description file is updated based on the primary identification code and a total length of a data file obtained after the to-be-written data is added, and the updated description file is persisted by using an atomic operation.

Here, the data start-end information is generated based on the data storage block, and can be used to record a start address and an end address of the to-be-written data in a data file. A storage block that stores corresponding data may be located according to the data start-end information in order to find the corresponding to-be-written data.

In some embodiments, the data start-end information can include: an identification code of the data storage block; start-end address information of data in the data storage block; a size of the to-be-written data; and a number of unit storage in the data storage block. An identification code of the data storage block can be used to uniquely identify the data storage block. Start-end address information of data in the data storage block can include a start position and an end position of the corresponding to-be-written data in the data file.

In some embodiments, the description file may include: a total length, a modification time, and a primary identification code of the data file. The description file can be used to facilitate reading data or appending the to-be-written data.

In some embodiments, each data storage block can include one or multiple unit storage blocks. When the data storage block has multiple unit storage blocks, the multiple unit storage blocks can have the same capacity.

According to the above exemplary method, when to-be-written data is acquired, a data storage block is allocated for storing the to-be-written data, and a primary start-end information storage block is allocated for storing a primary start-end information list including data start-end information. A description file is updated according to the primary identification code of the primary start-end information storage block and the total length of the data file obtained after the to-be-written data is added, and the updated description file is then persisted by using an atomic operation.

Accordingly, when to-be-written data is appended, a data storage block and a primary start-end information storage block are reallocated (Copy-On-Write), which can ensure that an existing data file is not overwritten in a process of appending the to-be-written data. Moreover, before being persisted, the description file is stored in the form of a temporary description file (for example, a temporary description file in a volatile medium such as a memory). The process of persisting the description file can be implemented by using atomic operations. For example, two atomic operations can be used: Put-If-Not-Exist and Test-And-Set. For the Put-If-Not-Exist (FileName, FileInfo) operation, a filename can be added to a record of file metadata only when the filename does not exist. For the Test-And-Set (FileName, NewFileInfo, OldFileInfo) operation, the updated description file can be persisted only when a filename exists and content of a current description file (FileInfo) corresponds to a description file (OldFileInfo) before the update. Before the description file is persisted, current to-be-written data is invisible to the user. That is, the user cannot read the current to-be-written data, while an existing data file in a cloud storage system is visible to the user. This way, consistency and stability of data can be maintained.

It should be appreciated that the foregoing atomic operation instructions are only examples. In view of the foregoing description, other atomic operations or persist manners may be used in other embodiments of this present application, which shall also fall within the protection scope of the present application.

In some embodiments, the acquired to-be-written data of the user may be to-be-written data committed by the user to a distributed system for the first time, or may be appended to-be-written data committed by the user for an existing data file in the distributed system. Using methods consistent with some embodiments of the present application, the to-be-written data committed by the user for the first time may be stored and a data file may be generated, or the appended to-be-written data committed by the user may be added to an existing data file.

Figure 2:
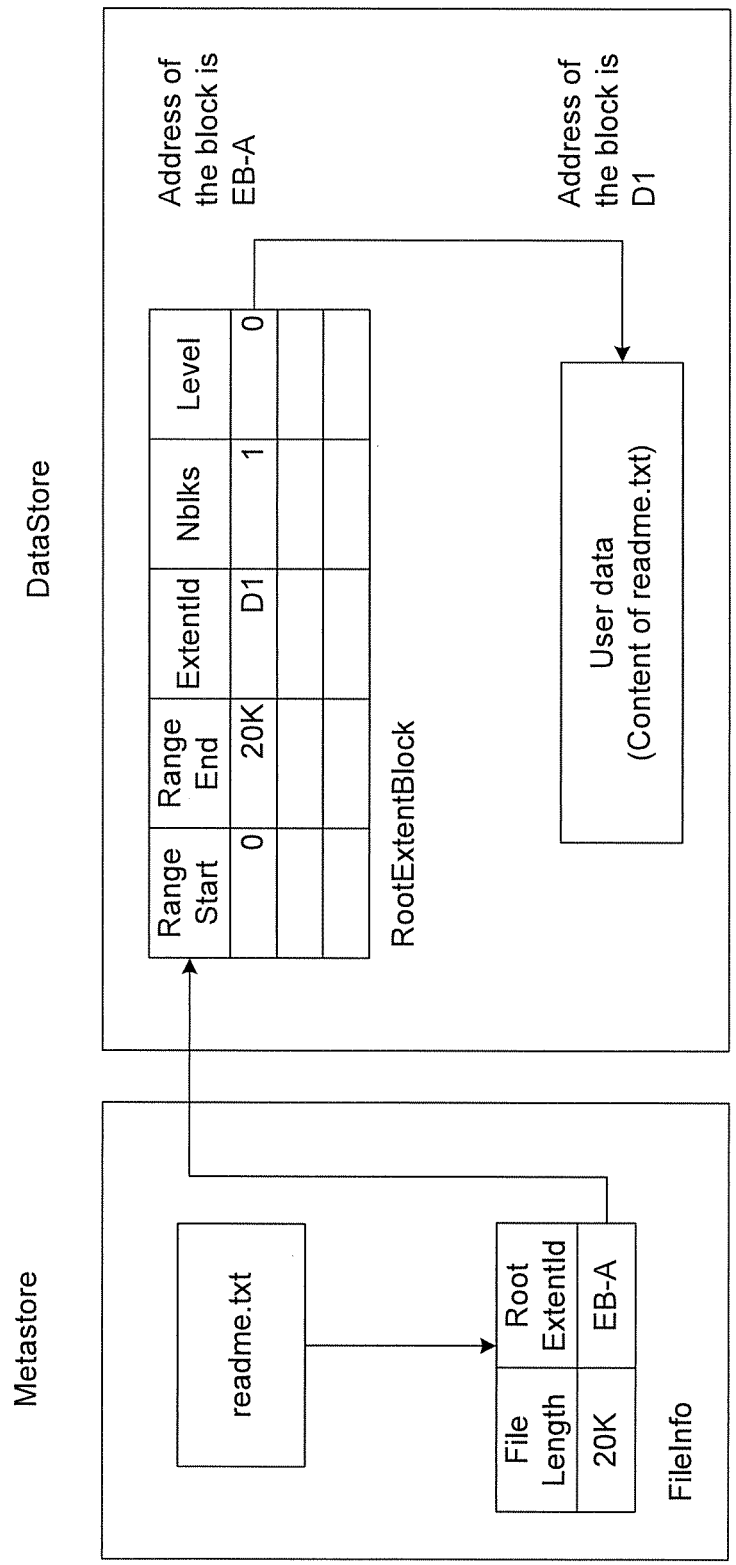
FIG. 2 and FIG. 3 are schematic diagrams illustrating an exemplary process of writing data in a distributed storage system according to some embodiments of the present application.
Figure 3:
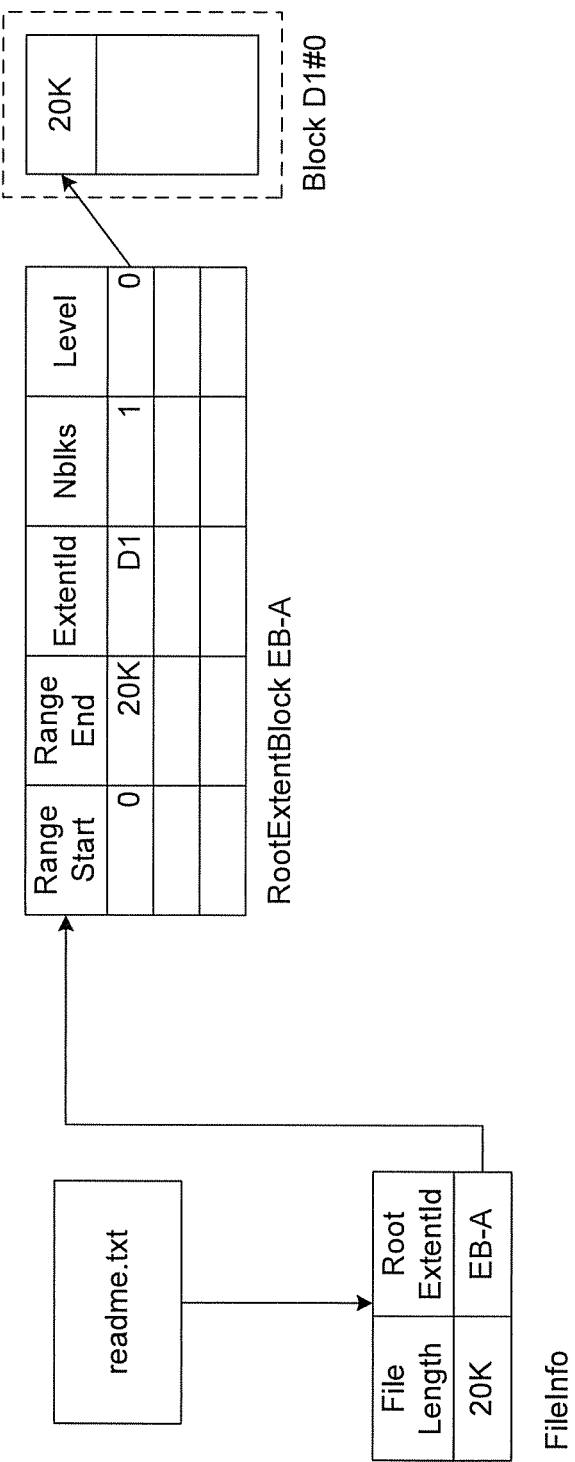

FIG. 2 and FIG. 3 are schematic diagrams of an exemplary process of writing data in a distributed storage system according to some embodiments of the present application. FIG. 2 shows an example where the to-be-written data is committed by the user for the first time. In a cloud storage system, an underlying storage may be divided according to the data type into a metadata storage area MetaStore and a data storage area DataStore, according to the type of data stored therein. As shown in FIG. 2, MetaStore can maintain a correspondence relationship between a filename (Readme.txt) and metadata. The metadata can include information for addressing user data. DataStore can be used to store the to-be-written data and related data start-end information of the to-be-written data. DataStore can be divided into multiple blocks having fixed sizes. Each block can have a corresponding address, and content of a block may be read according to the address of the block. When a filename exists in MetaStore, the user may perform reading data or appending data to the file. The distinction between MetaStore and DataStore is mainly a logical distinction. MetaStore and Datastore can be implemented on the same underlying storage.

It should be appreciated that the foregoing manner of dividing a storage area according to a data type is only an example. Other techniques may be applicable to other embodiments of the present application, which shall also fall within the protection scope of the present application.

Referring back to FIG. 1 and FIG. 2, in step S101, the to-be-written data of the user is acquired, and a data storage block D1 is allocated to store the to-be-written data. As shown in the example of FIG. 2, a data storage block D1 is allocated to store the to-be-written data (20K). In step S102, data start-end information Extent is generated according to the data storage block D1. The data start-end information Extent can include: a start address RangeStart and an end address RangeEnd of the to-be-written data in a data file, a data storage block identification code ExtentID of the data storage block D1, a number Nblks of unit storage blocks in the data storage block D1, and a primary information level. Generally, level 0 means directly pointing to the data storage block that stores the to-be-written data. As shown in the example of FIG. 2, the data start-end information Extent according to the data storage block D1 includes: RangeStart 0, RangeEnd 20k, ExtentID of the data storage block D1, the number Nblks of unit storage blocks 1, and the primary information level 0.

In step S102, the data start-end information Extent is used to update the primary start-end information list and store it in a primary start-end information storage block RootExtentBlock, as shown in FIG. 2. In step S103, a primary identification code RootExtentID is generated based on the primary start-end information storage block RootExtentBlock. In the example as shown in FIG. 2, the generated primary identification code RootExtentID is EB-A. In step S104, a description file FileInfo is updated based on the primary identification code RootExtentID and a total length Filelength of the data file obtained after the to-be-written data is added. As shown in the example in FIG. 2, the description FileInfo is updated to reflect the generated primary identification code RootExtendID, which is EB-A, and the file length of the data file, which is 20K. The updated description file FileInfo can be persisted by using the atomic operation Put-If-Not-Exist.

When the appended to-be-written data committed by the user is added to the existing data file, two manners may be used: writing data in which the user specifies an append position, and writing data in which the user does not specify an append position. Embodiments of the present application are further described below with respect to the two manners.

For writing data in which the user specifies an append position, in step S101, a requested position of the to-be-written data is acquired. It is determined whether the requested position of the to-be-written data is consistent with a total length of a current data file. When the requested position is consistent with the total length of the current data file, the corresponding to-be-written data is acquired. When the requested position is inconsistent with the total length of the current data file, acquisition of the corresponding to-be-written data is rejected. The total length of the current data file can be fed back to the user equipment at the same time.

In cases where the user specifies an append position, when the user concurrently writes to-be-written data, concurrent write requests at the same write position may be avoided. That way, it may help to prevent multiple pieces of repetitive written data from being combined into a data file. For example, it is assumed that there are written data A, written data B, and written data C. An existing data file in a distributed system includes data A and B, and a user concurrently writes data C. When the user concurrently uploads two pieces of data C, only one of the two pieces of data C can be successfully uploaded. In this way, the written data includes A, B, and C, rather than A, B, and two pieces of C. By adding data for which the user specifies an append position, data file errors caused by concurrent writes by the user may be prevented.

As an example, with reference to FIG. 3, the user has uploaded 20K to-be-written data the first time. In this case, the 20K to-be-written data is stored in a data storage block Block D1#0, and data start-end information Exent1 is generated and stored in a start-end information storage block RootExtentBlock EB-A. Correspondingly, a file length Filelength of the description file FileInfo is 20K, and the primary identification code RootExtentID is EB-A. It should be appreciated that the foregoing description of specific scenarios is only an example.

When committing the to-be-written data, the user commits the requested position at the same time. Before acquiring the to-be-written data in step S101, it is determined whether the write position committed by the user is equal to the file length Filelength of the description file FileInfo. If the write position is not equal to the file length Filelength, the write request can be rejected. If the write position is equal to the file length Filelength, the to-be-written data can be acquired.

Figure 4:
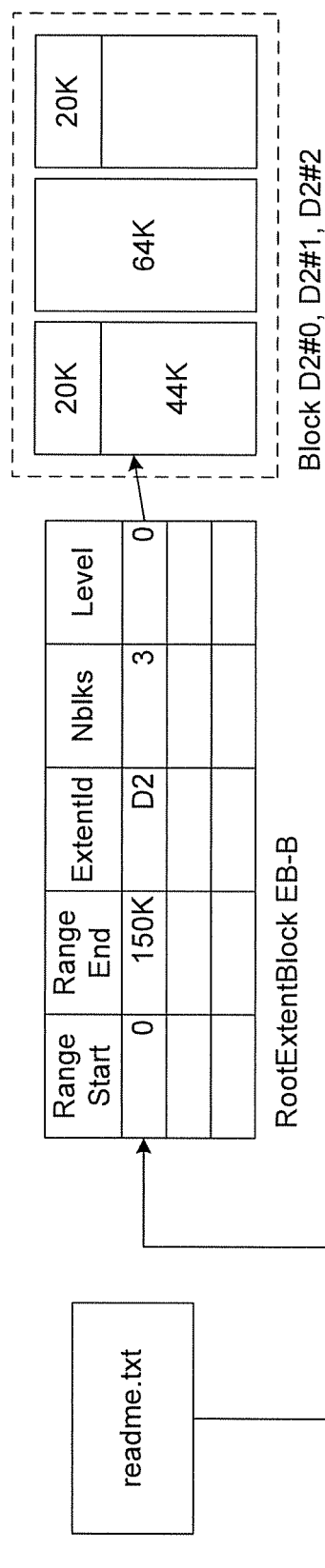
FIG. 4 and FIG. 5 are schematic diagrams illustrating an exemplary process of writing data in a distributed storage system according to some embodiments of the present application.
Figure 5:
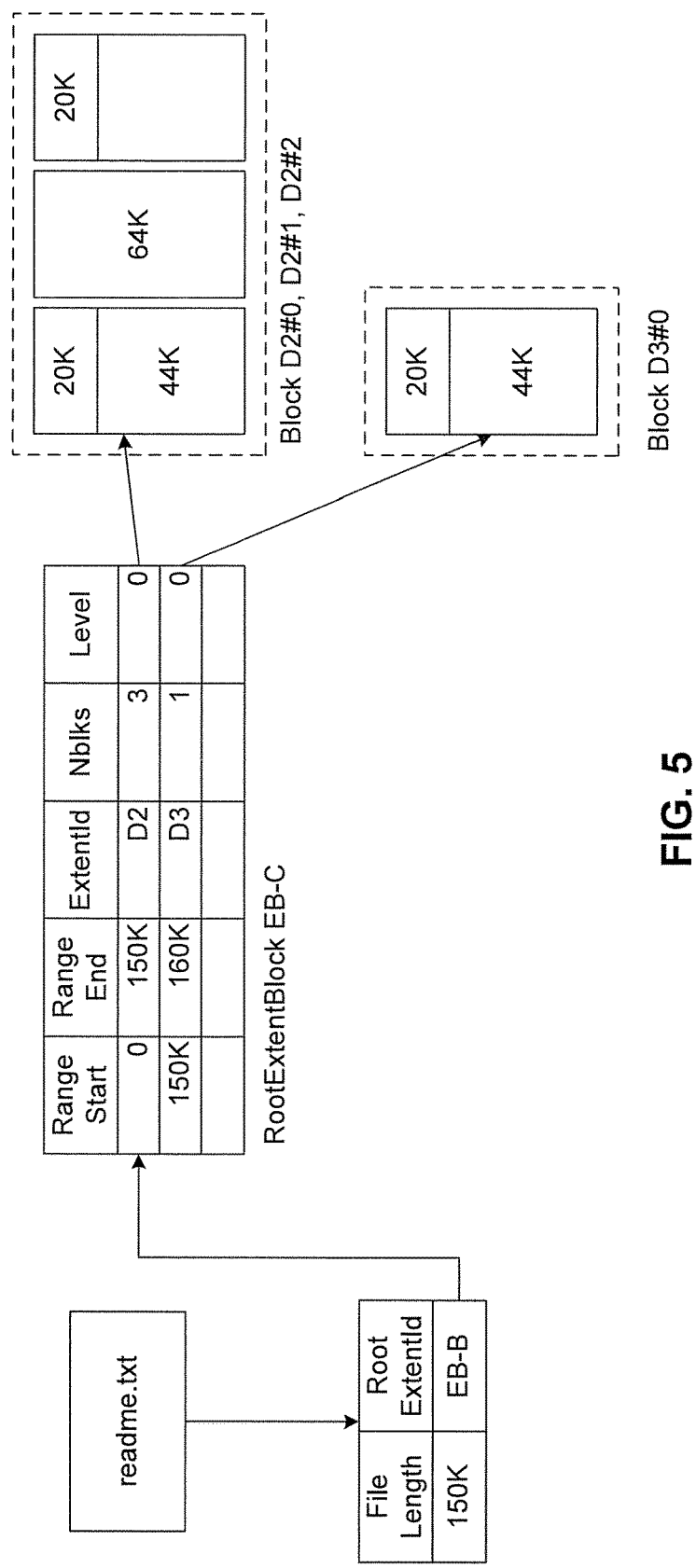

FIG. 4 and FIG. 5 are schematic diagrams of an exemplary process of writing data in a distributed storage system according to some embodiments of the present application. With reference to FIG. 4, in step S101, after the to-be-written data is acquired, it can be determined whether a size of previous data stored in a data storage block allocated the last time before the to-be-written data is acquired is less than a preset capacity. When the size is less than the preset capacity, a penalty reading operation can be performed. The penalty reading operation can include combining the previous data and the to-be-written data, and storing the combined data in the newly allocated data storage block.

As an example, based on FIG. 2 and FIG. 3 and further referring to FIG. 4, it is assumed that a preset capacity of a unit storage block of the data storage block is 64K. The size of the appended to-be-written data committed by the user is 130K. The size of the previous data stored in the data storage block allocated the last time before the to-be-written data is appended is 20K, which is less than the preset capacity of 64K. The penalty reading operation can be performed. The penalty reading operation includes rereading the 20K previous data, combining the 20K previous data and the currently committed 130K appended to-be-written data, and storing the combined data in a newly allocated data storage block Block D2. As shown in FIG. 4, Block D2 includes three unit storage blocks Block D2#0, Block D2#1, and Block D2#2.

In step S102, data start-end information Exent2 about the data storage block can be generated according to the newly allocated data storage block Block D2, and is stored in the primary start-end information storage block RootExtent-Block EB-B. The data start-end information Exent2 can include a start address 0 of the to-be-written data and an end address 150K of the to-be-written data, an identification code D2 of the data storage block, a number Nblks of unit storage blocks 3, and a level 0. In step S103, a primary identification code EB-B of data start-end information RootExtentBlock EB-B can be generated. In step S104, the description file can be updated. The file length Filelength of the updated data file is 150K, and the primary identification code RootExtentID is EB-B.

In the foregoing example, if the size of the previous data stored in the data storage block allocated the last time before the to-be-written data is acquired is greater than or equal to the preset capacity, the penalty reading operation may not be performed. The to-be-written data can be directly stored in the newly allocated data storage block.

As an example, based on FIG. 2 to FIG. 4 and furthering referring to FIG. 5, in step S101, it is assumed the size of the to-be-written data committed by the user the next time is 10K. The size of the previous data stored in the data storage block allocated the last time before the to-be-written data is acquired is 150K, which is greater than the preset capacity of 64K. In this case, the 150K previous data is not reread, and the 10K current to-be-written data can be directly stored in the newly allocated data storage block Block D3. In step S102 and step S103, data start-end information Exent3 can be generated and added to the primary start-end information list. Data start-end information Exent3 can be stored in a newly allocated primary start-end information storage block RootExtentBlock EB-C, and a primary identification code EB-C can be generated. In step S104, the description file FileInfo can be updated based on the primary identification code EB-C and the total length Filelength of the data file 160K. The updated description file FileInfo can be persisted by using the atomic operation Test-And-Set.

It should be appreciated that the foregoing description of specific scenarios is only an example. Other manners of writing data may be applicable according to the disclosure of the present disclosure, which shall also fall within the protection scope of the present application.

In some embodiments, the user does not specify a requested position of to-be-written data. When the user commits to-be-written data, the user does not need to commit a requested position at the same time. Before the to-be-written data is acquired, a total length of a data file can be acquired. Next, step S101 to step S103 are performed, similar to step S101 to step S103 as described above with reference to FIG. 2 to FIG. 5, the detailed description of which is incorporated herein by reference. In step S104, the file length of the data file before the to-be-written data is acquired can be used as the requested position of the to-be-written data to determine whether the requested position is consistent with a total length of the current data file. When the requested position is consistent with the total length, the description file is updated based on the primary identification code and the total length of the data file after the to-be-written data is added. The description file can be persisted by using an atomic operation.

During performance of step S101 to step S103 and before step S104, if the data file stored in the device does not change, the length and the description file of the corresponding data file do not change either. In that case, in step S104, the file length of the data file before the to-be-written data is acquired can be a requested position of the to-be-written data. It can be determined that the requested position is consistent with the total length of the current data file. The description file can be updated based on the primary identification code and the total length of the data file obtained after the to-be-written data is added. The updated description file can be persisted by using the atomic operation. If during performance of step S101 to step S103 and before step S104, the data file stored in the device changes (for example, during this period, concurrent write data is successfully appended, and the data file is modified as a result), the length and the description file of the corresponding data file also change. In this case, in step S104, the file length of the data file acquired before the to-be-written data is acquired can be a requested position of the to-be-written data. It can then be determined that the requested position is inconsistent with the total length of the current data file. The to-be-written data needs to be appended again.

It should be appreciated that the foregoing description of specific scenarios are only exemplary. Other manners can also be applicable to the present application consistent with the present disclosure, which shall also fall within the protection scope of the present application.

Figure 6:
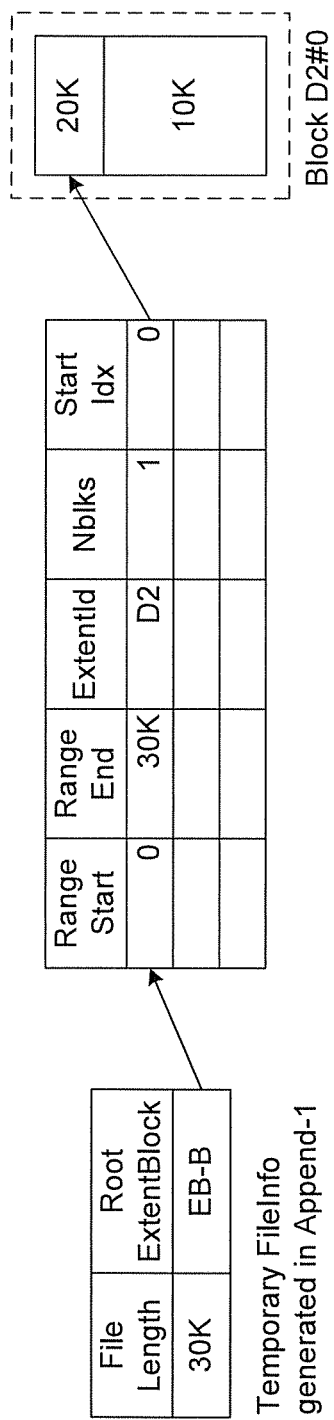
FIG. 6 to FIG. 8 are schematic diagrams illustrating an exemplary process of writing data in a distributed storage system according to some embodiments of the present application.
Figure 7:
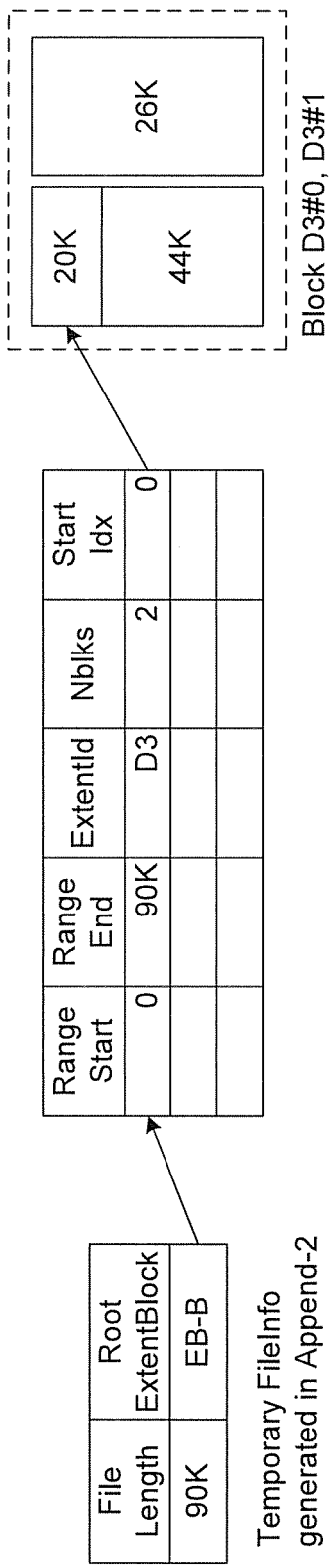
Figure 8:
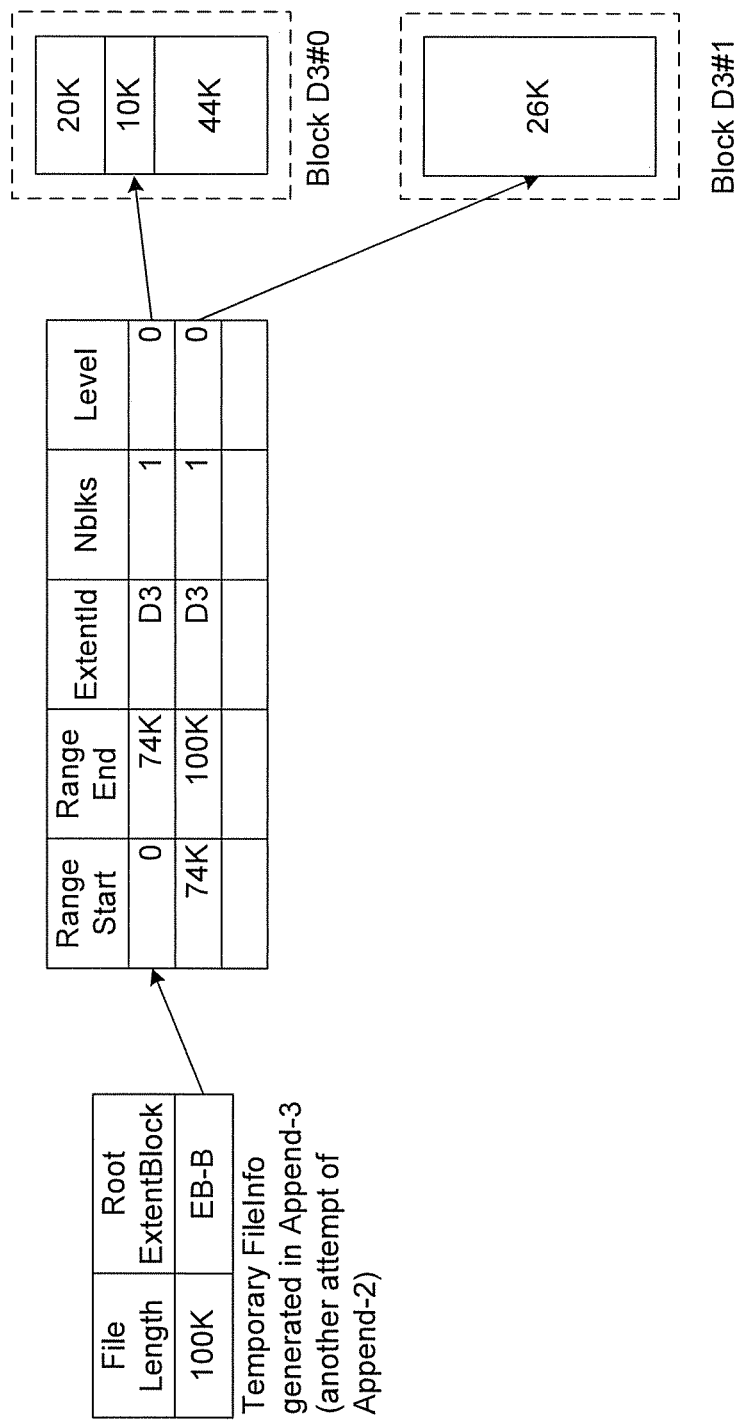

FIG. 6 to FIG. 8 are schematic diagrams illustrating an exemplary process of writing data in a distributed storage system according to some embodiments of the present application. For example, with reference to FIG. 6, it is assumed that an initial data file has 20K data, and there are concurrent appending operations Append-1 (appending data of 10K) and Append-2 (appending data of 70K). It is assumed that appending operation in Append-1 succeeds and 100K data is appended, and the appending operation in Append-2 fails. That is, in FIG. 7, a temporary description file FileInfo generated in Append-2 is not successfully persisted, and the to-be-written data actually fails to be appended in Append-2. In this case, with respect to Append-2, another appending operation Append-3 (another attempt of Append-2) is performed in order to append the to-be-written data again.

If penalty reading does not occur in Append-2, in Append-3, a length of the current data file is needed. The reacquired file length of the data file is used as the requested position of the to-be-written data. It can be redetermined whether the requested position is consistent with the total length of the current data file. When the requested position is consistent with the total length, the description file can be updated based on the primary identification code and the total length of the data file obtained after the to-be-written data is added. The updated description file can be persisted by using the atomic operation. In the forgoing example, referring to FIG. 7, if penalty reading does not occur, Append-3 modifies the FileInfo generated during the operation of Append-2 (such as the FileLength), and modifies information in the newly added Extent in the RootExtentBlock (such as the RangeStart and RangeEnd of the newly added Extent) generated during the operation of Append-2.

If penalty reading occurs in Append-2, it can be redetermined whether the size of the previous data stored in the data storage block allocated the last time before the to-be-written data is acquired is less than the preset capacity. When the size of the previous data is less than the preset capacity, the penalty reading operation is reperformed. The penalty reading operation can include: combining the previous data and the to-be-written data, and storing the combined data in the newly allocated data storage block. Start-end information generated based on the newly allocated data storage block can be updated in the primary start-end information list. When the size is greater than or equal to the preset capacity, the to-be-written data can be written and stored directly in the newly allocated data storage block. Start-end information generated based on the data storage block can be updated in the primary start-end information list.

For example, referring to FIG. 8, Append-3 is performed to reappend the 70K data, which was not appended in failed Append-2. After Append-1 successfully adds 10K data, the size of the previous data stored in the data storage block Block D2#0 allocated the last time before the to-be-written data in Append-3 is acquired is 30K, which is less than the preset capacity of 64K. In this case, the 30K previous data can be reread and combined with 70K to-be-written data in Append-3. The combined data can be stored in data storage block Block D3.

In cases where the user does not specify an append position, when the user commits to-be-written data, the user does not need to commit a requested position at the same time. For example, each time after the written data of the user is acquired, the written data is appended to the existing data file. When there is concurrent to-be-written data, a distributed system acquires the total length of the current data file, and sequentially combines all received data blocks into the data file according to an order of received requests. For example, it is assumed that there are written data A, written data B, and written data C. An existing data file in a distributed system includes written data A and B, and a user concurrently writes data C. When the user concurrently uploads two pieces of data C, and after one of the two pieces of to-be-written data C is successfully written, the total length of the data file changes. The second piece of to-be-written data C may fail to be written the first time. In this case, the total length of the data file can be reacquired for the second piece of to-be-written data C, and another attempt of write can made to successfully write data C. The two pieces of data C that are concurrently uploaded can be sequentially written in the data file, and eventually the data file includes A, B, C, and C. Applications in which the user does not specify an append position can be suitable for a scenario where an order of appended data is of no concern, for example, in cases of collecting program logs in a distributed environment.

In some embodiment, the above-described method of writing data can further include: determining whether a capacity of the primary start-end information list reaches a capacity threshold or whether a quantity of data start-end information thereof reaches a quantity threshold. When the capacity reaches the capacity threshold or the quantity reaches the quantity threshold: transferring all data start-end information that are currently in the primary start-end information list to a secondary start-end information list; storing the secondary start-end information list in a newly allocated secondary start-end information storage block; and storing secondary start-end information generated based on the secondary start-end information storage block in the primary start-end information storage block.

As an example, the above-described process can include: examining the primary start-end information storage block RootExtentBlock. If the capacity of the primary start-end information list reaches the capacity threshold or the quantity of the data start-end information thereof reaches the quantity threshold, multi-level processing (Level Promotion) can be performed. All data start-end information that is currently in the primary start-end information list can be transferred to a secondary start-end information list, which can be stored in a newly allocated secondary start-end information storage block. Secondary start-end information generated based on the secondary start-end information storage block can be stored in the primary start-end information storage block.

Figure 9:
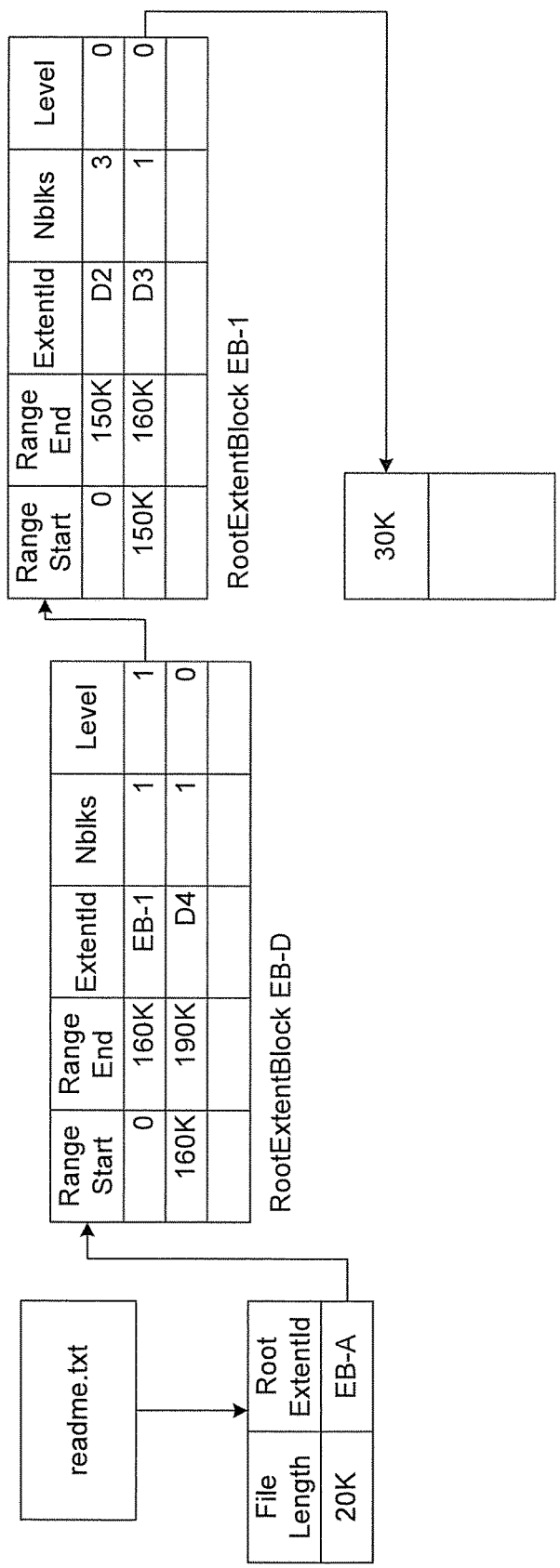
FIG. 9 is a schematic diagram illustrating an exemplary process of writing data involving level promotion in a distributed storage system according to some embodiments of the present application.

FIG. 9 is a schematic diagram illustrating an exemplary process of writing data involving level promotion in a distributed storage system according to some embodiments of the present application. An objective of Level Promotion is to limit a size of the primary start-end information storage block RootExtentBlock, so as to effectively support a large file. For example, data start-end information, that is, multiple pieces of start-end information Extent of Level 0, exists initially in the primary start-end information storage block RootExtentBlock. With reference to FIG. 9, when a number of the level 0 Extent exceeds a particular threshold (for example, 1024), and when the size of the primary start-end information storage block RootExtentBlock is greater than or equal to a capacity threshold BlockSize, a new storage block can be allocated as a secondary start-end information storage block ExtentBlock EB-1. The secondary start-end information storage block ExtentBlock EB-1 can store the secondary start-end information list, including the foregoing level 0 Extent. level 1 Extent can be generated based on the secondary start-end information storage block ExtentBlock EB-1, and can be stored in a newly allocated primary start-end information storage block RootExtentBlock EB-D. A data start address RangeStart of level 1 Extent is a data start address RangeStart of the first data start-end information Extent included in the secondary start-end information storage block ExtentBlock EB-1. A data end address RangeEnd of level 1 Extent is a data end address RangeEnd of the last start-end information Extent included in the secondary start-end information storage block ExtentBlock EB-1. A secondary identification code ExtentID corresponding to the secondary start-end information storage block ExtentBlock EB-1 is EB-1.

It should be appreciated that the foregoing description of specific scenarios is only an example. Other manners can be applicable to the present application consistent with the present disclosure, and should also fall within the protection scope of the present application.

In some embodiments, the above-described method of writing data can further include: setting a primary start-end information storage block corresponding to the primary start-end information list before update to a read-only state; and after the description file is successfully persisted, clearing the primary start-end information storage block corresponding to the primary start-end information list before update. For example, when the forgoing step S101 to step S104 are performed to write data, the primary start-end information storage block corresponding to the primary start-end information list before update can be set to a read-only state. After the description file is successfully persisted, the primary start-end information storage block corresponding to the primary start-end information list before update is cleared. For example, with reference to FIG. 4, the primary start-end information storage block EB-B in FIG. 4 can be set to a read-only state in the process of writing data in FIG. 5. After the primary start-end information storage block EB-C shown in FIG. 5 is updated and the updated description file FileInfo is persisted, the primary start-end information storage block EB-B can be cleared. Similarly, the data storage block Block D1#0 shown in FIG. 3 can be cleared after the data storage blocks Block D2#0, D2#1, and D2#2 in FIG. 4 are stored and the updated description file FileInfo is persisted. This way, when a user appends to-be-written data, a data file stored in a device may still provide a data acquisition service to the user.

It should be appreciated that the foregoing description of specific scenarios is only an example. Other manners can be applicable to the present application consistent with the present disclosure, and should also fall within the protection scope of the present application.

In view of the foregoing, according to some embodiments of the present application, a method for writing data can include: acquiring to-be-written data of a user, and storing the to-be-written data in a newly allocated data storage block; generating data start-end information about the data storage block, updating a primary start-end information list based on the data start-end information, and storing the updated primary start-end information list in a newly allocated primary start-end information storage block; generating a primary identification code based on the primary start-end information storage block; and updating a description file based on the primary identification code and a total length of a data file obtained after the to-be-written data is added, and persisting the updated description file by using an atomic operation.

Applying methods consistent with some embodiments of the present application, a data file is not overwritten but is instead updated by making a copy in a newly allocated storage block. The updated description file can be persisted by using the atomic operation. This way, in a process of appending data, it can be ensured that the data file is not damaged, and the readability and consistency of data can be maintained, thereby facilitating use by a user. Further, embodiments of the present application can support writes for which a user specifies a write position of to-be-written data, and also writes for which the user does not specify a write position of to-be-written data. This can help improve the flexibility of writing data by the user.

Figure 10:
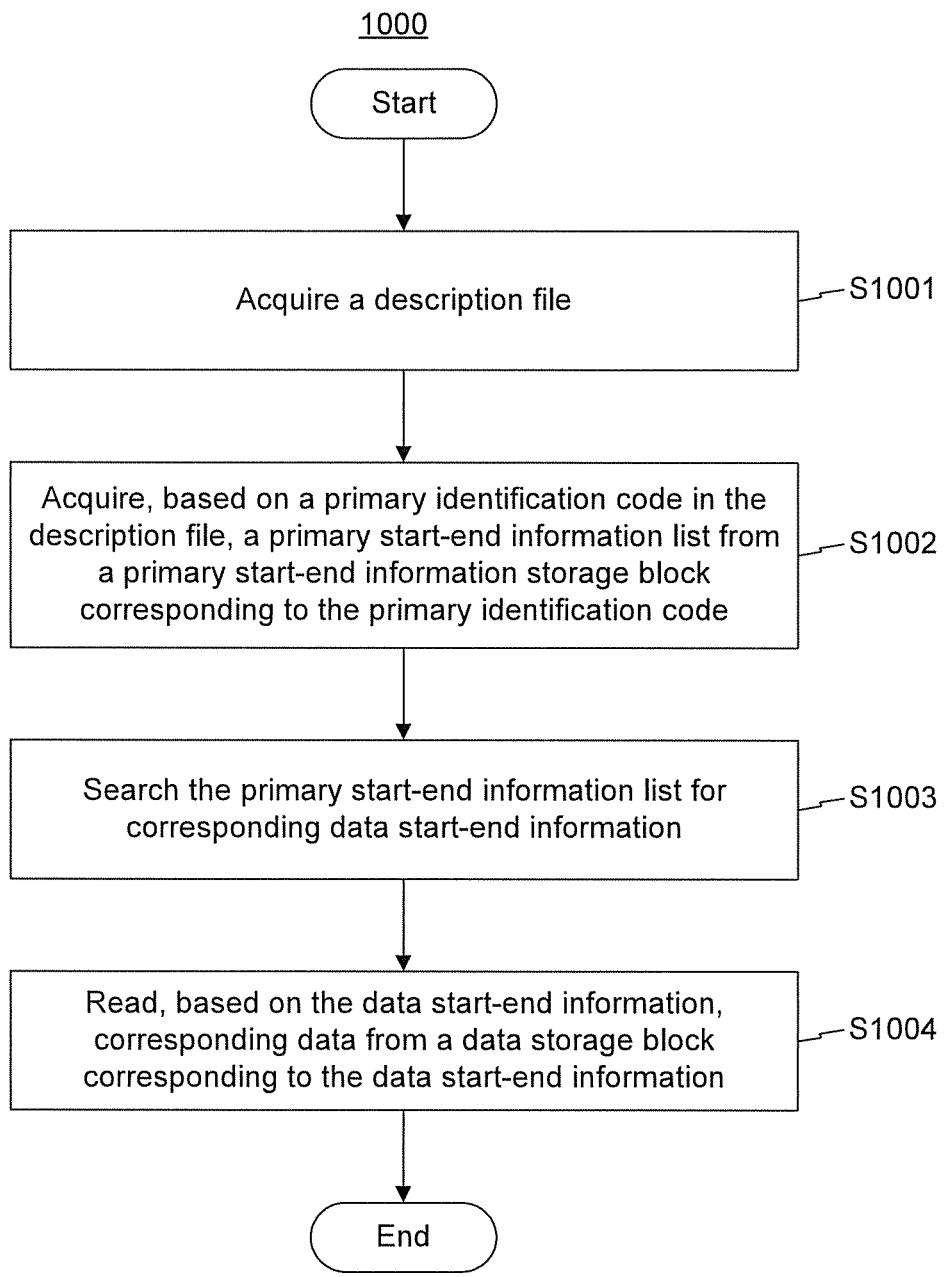
FIG. 10 is a flow chart of an exemplary method for acquiring data in a distributed storage system according to some embodiments of the present application.

FIG. 10 is a flow chart of an exemplary method 1000 for acquiring data in a distributed storage system according to some embodiments of the present application. The exemplary method 1000 can include at least steps S1001-S1004.

In step S1001, a description file is acquired.

In step S1002, a primary start-end information list is acquired, based on a primary identification code in the description file, from a primary start-end information storage block corresponding to the primary identification code.

In step S1003, the primary start-end information list is searched for corresponding data start-end information.

In step S1004, corresponding data is read, based on the data start-end information, from a data storage block corresponding to the data start-end information.

In some embodiments, the primary start-end information list further includes secondary start-end information, step S1003 can further include: searching, based on the secondary start-end information, a secondary start-end information storage block corresponding to the secondary start-end information for the corresponding data start-end information. For example, binary search can be used to search for the corresponding data start-end information.

In view of the above description, by the above means of acquiring data according to some embodiments of the present application, data can be acquired in time for a user to read. Data can be read at any time without being affected by the written data, thereby facilitating the use by the user.

Further, the above exemplary method for writing data can support a write for which a user specifies a write position of to-be-written data, and can also support a write for which the user does not specify a write position of the to-be-written data, thereby improving the flexibility of writing data by the user.

Figure 11:
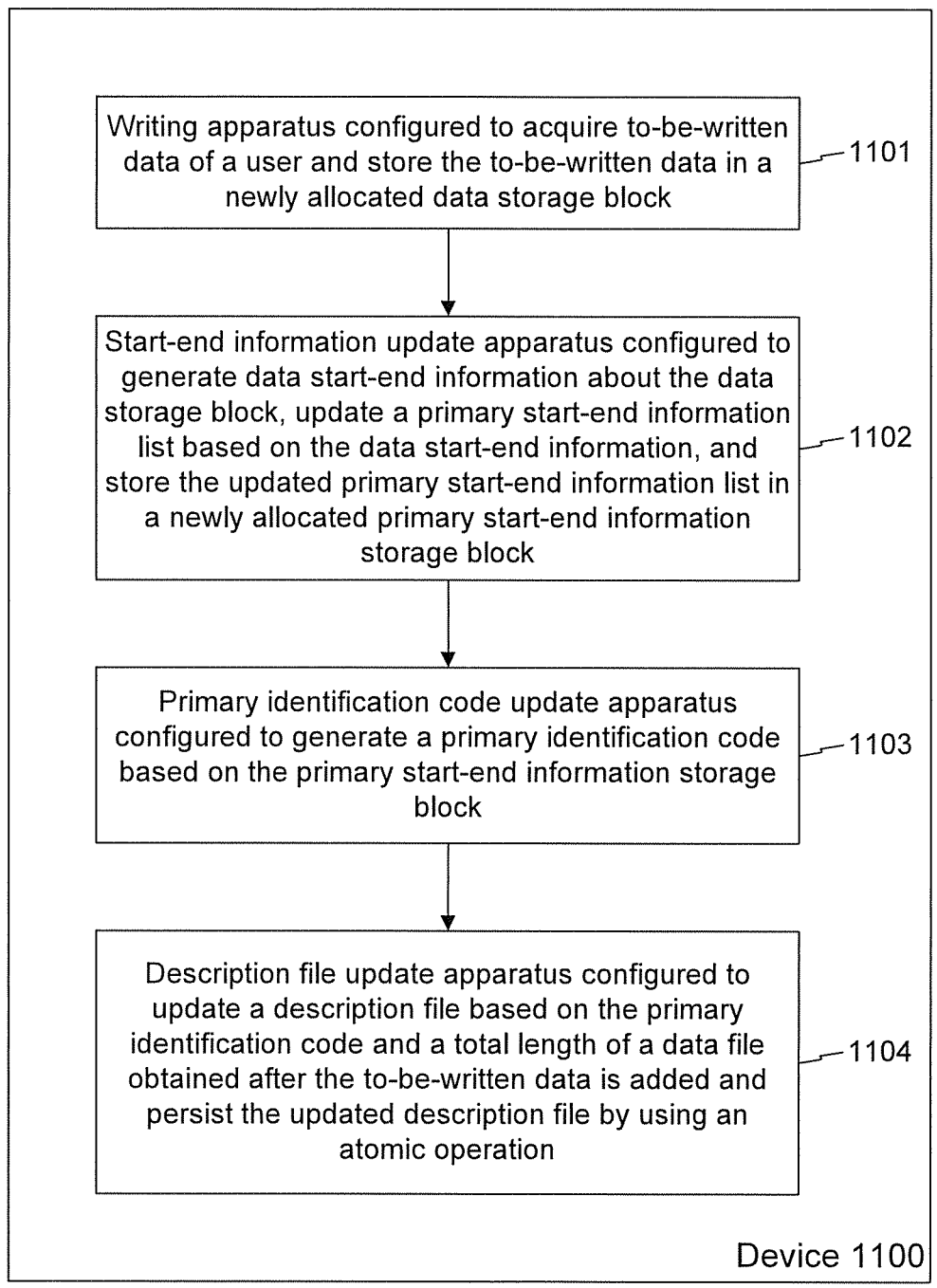
FIG. 11 is a schematic diagram of an exemplary device for writing data in a distributed storage system according to some embodiments of the present application.

FIG. 11 is a schematic diagram of an exemplary device 1100 for writing data in a distributed storage system according to some embodiments of the present application. The exemplary device 1100 can include: a writing apparatus 1101, a start-end information update apparatus 1102, a primary identification code update apparatus 1103, and a description file update apparatus 1104.

The writing apparatus 1101 can be configured to acquire to-be-written data of a user, and store the to-be-written data in a newly allocated data storage block.

The start-end information update apparatus 1102 can be configured to generate data start-end information about the data storage block, update a primary start-end information list based on the data start-end information, and store the updated primary start-end information list in a newly allocated primary start-end information storage block.

The primary identification code update apparatus 1103 can be configured to generate a primary identification code based on the primary start-end information storage block.

The description file update apparatus 1104 can be configured to update a description file based on the primary identification code and a total length of a data file obtained after the to-be-written data is added, and persist the updated description file by using an atomic operation.

In some embodiments, the device 1100 can include, but is not limited to, user equipment or a device that is formed by integrating user equipment and a network device via a network. The user equipment can include, but is not limited to, a mobile electronic product that supports human-computer interaction involving operation by a user using a touch panel, such as a smartphone and a PDA. Any operating system, such as an Android operating system or an iOS operating system, may be used on the mobile electronic product. The network device can include an electronic device that can automatically perform numerical computation and information processing according to a set of instructions stored in advance. Hardware of the network device can include, but is not limited to, a microprocessor, an application-specific integrated circuit (ASIC), a field-programmable gate array (FPGA), a digital signal processor (DSP), and an embedded device. The network can include, but is not limited to, the Internet, a wide area network, a metropolitan area network, a local area network, a VPN network, and a wireless Ad Hoc network. In some embodiments, the device 1100 may further be in the form of a script program that is operated on the user equipment, a device that is formed by integrating the user equipment, the network device and a touch terminal, or the network device and a touch terminal via a network. It should be appreciated that the foregoing device 1100 is only an example. Other devices can be applicable to the present application consistent with the disclosure herein, which should also fall within the protection scope of the present application.

The foregoing described apparatuses with respect to FIG. 11 can work and interact with each other continuously. It should be appreciated that continuously means that the foregoing apparatuses work separately in real time or according to a working mode requirement that is set or is adjusted in real time.

In the above example, the data start-end information is generated based on the data storage block, and is used to record a start address and an end address of to-be-written data in a data file. A storage block that stores corresponding data may be found according to the data start-end information, in order to locate the corresponding to-be-written data.

In some embodiments, the data start-end information can include: an identification code of the data storage block; start-end address information of data in the data storage block; a size of the to-be-written data; and a number of unit storage blocks in the data storage block. An identification code of the data storage block is used to uniquely identify the data storage block. Start-end address information of data in the data storage block includes a start position and an end position of the corresponding to-be-written data in the data file.

In some embodiments, the description file may include: a total length, a modification time, and a primary identification code of the data file. The description file can be used to facilitate reading data or appending data.

In some embodiments, each data storage block can include one or multiple unit storage blocks. Further, when the data storage block has multiple unit storage blocks, the multiple unit storage blocks can have the same capacity.

In the foregoing example, when device 1100 acquires to-be-written data, a data storage block is allocated for storing the to-be-written data. A primary start-end information storage block is allocated for storing a primary start-end information list having data start-end information. The description file is updated according to the primary identification code of the primary start-end information storage block and the total length of the data file obtained after the to-be-written data is added. The updated description file is then persisted by using an atomic operation. Accordingly, when to-be-written data is appended, a data storage block and a primary start-end information storage block are reallocated (Copy-On-Write), to ensure that an existing data file is not overwritten in a process of appending the to-be-written data. Moreover, before being persisted, the description file is stored in the form of a temporary description file (for example, a temporary description file in a volatile medium such as a memory). The process of persisting the description file is implemented by using an atomic operation. For example, two atomic operations can be used: Put-If-Not-Exist and Test-And-Set. For the Put-If-Not-Exist (FileName, FileInfo) operation, a filename can be added to a record of file metadata only when the filename does not exist. For the Test-And-Set (FileName, NewFileInfo, OldFileInfo) operation, the updated description file can be persisted only when a filename exists and content of a current description file (FileInfo) corresponds to a description file (OldFileInfo) before update. Before the description file is persisted, current to-be-written data is invisible to the user. That is, the user cannot read the current to-be-written data, while an existing data file in a cloud storage system is visible to the user. This way, it can help maintain the consistency and stability of data.

Here, the acquired to-be-written data of the user may be to-be-written data committed by the user to a distributed system for the first time, or it may be appended to-be-written data committed by the user for an existing data file in the distributed system. With device 1100 in this example, the to-be-written data committed by the user for the first time may be stored and a data file may be generated, or the appended to-be-written data committed by the user may be added to the existing data file.

The following description refers back to FIG. 2 and FIG. 3, which are schematic diagrams illustrating writing data in a distributed storage system according to some embodiments of the present application. In a cloud storage system, an underlying storage may be divided according to a data type. For example, the underlying storage can be divided into a metadata storage area MetaStore and a data storage area DataStore. MetaStore maintains a correspondence relationship between a filename (Readme.txt) and metadata. The metadata includes information for addressing user data. DataStore can be used to store the to-be-written data and related data start-end information of the to-be-written data. DataStore can be further divided into multiple blocks having fixed sizes. Each block has a corresponding address, and content of a block may be read according to the address of the block. When a filename exists in MetaStore, the user may perform an append operation or a read operation on the file. It should be appreciated that MetaStore and DataStore are mainly a logical distinction, and they may be implemented on the same underlying storage.

It should be appreciated that the foregoing manner of dividing a storage area according to a data type is only an example. Other manners may be applicable to the present application consistent with the present disclosure, which should also fall within the protection scope of the present application.

For example, in the writing apparatus 1101 of FIG. 11, the to-be-written data of the user is acquired, a data storage block D1 is allocated to store the to-be-written data as shown in FIG. 2. In the start-end information update apparatus 1102, the data start-end information Extent is generated according to the data storage block D1. The data start-end information Extent includes a start address RangeStart and an end address RangeEnd of the to-be-written data in a data file, a data storage block identification code ExtentID of the data storage block D1, a number Nblks of unit storage blocks in the data storage block D1, and a primary information level. Generally, when the level is 0, it means it directly points to the data storage block that stores the to-be-written data. The data start-end information Extent can then used to update the primary start-end information list and can be stored in a primary start-end information storage block RootExtentBlock. In the primary identification code update apparatus 1103, a primary identification code RootExtentID is generated based on the primary start-end information storage block RootExtentBlock. In the description file update apparatus 1104, a description file FileInfo is updated based on the primary identification code RootExtentID and a total length Filelength of the data file obtained after the to-be-written data is added. The updated description file FileInfo can be persisted by using the atomic operation Put-If-Not-Exist. Reference can be made to the description above with respect to corresponding processes in the exemplary method embodiments.

When the appended to-be-written data committed by the user is added to the existing data file, two manners may be used: a manner of writing data in which the user specifies an append position; and a manner of writing data in which the user does not specify an append position. The exemplary device 1100 in the present example is further described below with reference to the two manners.

With respect to writing data for which the user specifies an append position, in the writing apparatus 1101, a requested position of the to-be-written data is acquired. It can be determined whether the requested position of the to-be-written data is consistent with a total length of a current data file. When the requested position is consistent with the total length, the corresponding to-be-written data is acquired. When the requested position is inconsistent with the total length, acquisition of the corresponding to-be-written data is rejected. The total length of the current data file may be fed back to the user at the same time. For the solutions in which the user specifies an append position, when there is concurrent to-be-written data by the user, concurrent data write requests at the same write position may be avoided. This can help prevent multiple pieces of repetitive write data from being combined into a data file. For example, it is assumed that there are written data A, written data B, and written data C. An existing data file in a distributed system includes data A and B, and a user concurrently writes data C. When the user concurrently uploads two pieces of data C, only one of the two pieces of data C that are concurrently uploaded can be successfully uploaded. In this way, the file includes written data A, written data B, and written data C, rather than A, B, and two pieces of C. According to the above exemplary method, by adding write data for which a user specifies an append position, data filed errors caused by concurrent writes of a user may be prevented.

For example, with reference to FIG. 3, the user uploads 20K to-be-written data the first time. In this case, the 20K to-be-written data is stored in a data storage block Block D1#0, and data start-end information Exent1 is generated and stored in a start-end information storage block RootExtentBlock EB-A. Correspondingly, a file length Filelength of the description file FileInfo is 20K, and the primary identification code RootExtentID is EB-A. When committing the to-be-written data, the user commits the requested position at the same time. Before the writing apparatus 1101 acquires the to-be-written data, the device first determines whether the write position committed by the user is equal to the file length Filelength of the description file. If the write position is not equal to the file length Filelength, a write request is rejected. If the write position is equal to the file length Filelength, the to-be-written data is acquired.

Referring back to FIG. 4 and FIG. 5, which are schematic diagrams illustrating writing data in a distributed storage system according to some embodiments of the present application. With reference to FIG. 4, the writing apparatus 1101 further includes a penalty reading unit configured to: after the to-be-written data is acquired, determine whether a size of previous data stored in a data storage block allocated the last time before the to-be-written data is acquired is less than a preset capacity. When the size is less than the preset capacity, the penalty reading unit performs a penalty reading operation, which includes: combining the previous data and the to-be-written data, and storing the combined data in the newly allocated data storage block.

Continuing with the foregoing example, based on FIG. 2 and FIG. 3, and with reference to FIG. 4, it is assumed that a preset capacity of a unit storage block of the data storage block is 64K. The size of the appended to-be-written data committed by the user is 130K. The size of the previous data stored in the data storage block allocated the last time before the to-be-written data is appended is 20K as shown in FIG. 3, which is less than the preset capacity of 64K. The penalty reading operation can be performed, which includes rereading the 20K previous data, combining the 20K previous data and the currently committed 130K appended to-be-written data, and storing the combined data in a newly allocated data storage block Block D2. Block D2 includes three unit storage blocks Block D2#0, Block D2#1, and Block D2#2. In the start-end information update apparatus 02, data start-end information Exent2 about the data storage block is generated according to the newly allocated data storage block Block D2, and is stored in the primary start-end information storage block RootExtentBlock EB-B. The data start-end information Exent2 includes: a start address 0 of the to-be-written data and an end address 150K of the to-be-written data, an identification code D2 of the data storage block, a number Nblks of unit storage blocks 3, and a level 0. In the primary identification code update apparatus 1103, a primary identification code EB-B of a data start-end information RootExtentBlock EB-B is generated. In the description file update apparatus 1104, the description file can be updated by using the atomic operation Test-And-Set. As shown in FIG. 4, the file length Filelength of the updated data file is 150K, and the primary identification code RootExtentID is EB-B.

If the size of the previous data stored in the data storage block allocated the last time before the to-be-written data is acquired is greater than or equal to the preset capacity, the penalty reading operation is not performed. The to-be-written data can be directly stored in the newly allocated data storage block.

Continuing with the foregoing example, on the basis of FIG. 2 to FIG. 4, and with reference to FIG. 5, for the writing apparatus 1101, in this operation, the size of the to-be-written data committed by the user again is 10K. It can be determined that the size of the previous data stored in the data storage block allocated the last time before the to-be-written data is acquired is 150K, which is greater than the preset capacity of 64 K. In this case, the 150K previous data is not reread, and the 10K current to-be-written data can be directly stored in a newly allocated data storage block Block D3. In the start-end information update apparatus 1102 and the primary identification code update apparatus 1103, data start-end information Exent3 is generated and added to the primary start-end information list. The data start-end information Exent3 is stored in a newly allocated primary start-end information storage block RootExtentBlock EB-C, and a primary identification code EB-C is generated. In the description file update apparatus 1104, the description file FileInfo is updated based on the primary identification code EB-C and the total length Filelength of the data file 160 K, as shown in FIG. 5. The updated description file FileInfo can be persisted by using the atomic operation Test-And-Set.

It is appreciated that the foregoing description of specific scenarios is only an example. Other manners can be applicable to the present application consistent with the present disclosure, which should also fall within the protection scope of the present application.

In some embodiments, the user does not specify a requested position of to-be-written data. When the user commits to-be-written data, the user does not need to commit a requested position at the same time. Before the to-be-written data is acquired, the device first acquires a total length of a data file. The processing at the writing apparatus 1101 to the primary identification code update apparatus 1103 is performed, similar to the description above regarding the writing apparatus 1101 to the primary identification code update apparatus 1103 with reference to FIG. 2 to FIG. 5. For simplicity, the above relevant description of the processes is incorporated herein by reference. When the processing of the description file update apparatus 1104 is performed, the file length of the data file before the to-be-written data is acquired is used as the requested write position of the to-be-written data. It can be determined whether the requested position is consistent with a total length of a current data file. When the requested position is consistent with the total length, the description file is updated based on the primary identification code and a total length of a data file obtained after the to-be-written data is added. The description file can be persisted by using an atomic operation.

During processing of the writing apparatus 1101 to primary identification code update apparatus 1103, and before processing of the description file update apparatus 1104, if the data file stored in the device does not change, the length and the description file of the corresponding data file do not change either. In this case, in the description file update apparatus 1104, the file length of the data file before the to-be-written data is acquired is the requested position of the to-be-written data. It can be determined that the requested position is consistent with the total length of the current data file. The description file is updated based on the primary identification code and the total length of the data file obtained after the to-be-written data is added. The updated description file can be persisted by using an atomic operation. If during the processing of the writing apparatus 1101 to the primary identification code update apparatus 1103, and before processing of the description file update apparatus 1104, the data file stored in the device changes (for example, during this period, concurrent write data is successfully appended, and the data file is modified as a result), the length and the description file of the corresponding data file also change. In this case, in the description file update apparatus 1104, using the file length of the data file acquired before the to-be-written data is acquired as the requested position of the to-be-written data, it can be determined that the requested position is inconsistent with the total length of the current data file, and data cannot be appended. The to-be-written data needs to be appended again.

It should be appreciated that the foregoing description of specific scenarios is only an example. Other manners can be applicable to the present application consistent with the present discourse, which should also fall within the protection scope of the present application.

FIG. 6 to FIG. 8 are schematic diagrams illustrating writing data in a distributed storage system according to some embodiments of the present application. For example, with reference to FIG. 6, it is assumed that a data file already has 20K to-be-written data, and there are two concurrent write operations Append-1 (appending data of 10K) and Append-2 (appending data of 70K). It is assumed that the appending operation in Append-1 succeeds, and 10K data is successfully appended. The to-be-written data fails to be appended in Append-2. As shown in FIG. 7, the temporary description file FileInfo generated in Append-2 is not successfully persisted, that is, the to-be-written data of 70K actually fails to be appended in Append-2. In this case, for Append-2, another appending operation Append-3 (another attempt of Append-2) is performed, in order to append the to-be-written data again.

If penalty reading does not occur in Append-2, in Append-3, a total length of the data file is reacquired. The reacquired file length of the data file is used as the requested position of the to-be-written data to redetermine whether the requested position is consistent with the total length of the current data file. When the requested position is consistent with the total length, the description file is updated based on the primary identification code and the total length of the data file obtained after the to-be-written data is added. The updated description file can be persisted by using the atomic operation.

If penalty reading occurs in Append-2, in Append-3, it is redetermined whether the size of the previous data stored in the data storage block allocated the last time before the to-be-written data is acquired is less than the preset capacity. When the size is less than the preset capacity, the penalty reading operation is reperformed, which can include: combining the previous data and the to-be-written data, and storing the combined data in the newly allocated data storage block. Start-end information generated based on the data storage block is updated in the primary start-end information list. When the size is greater than or equal to the preset capacity, the to-be-written data is written and directly stored in the newly data storage block. Start-end information generated based on the data storage block is updated in the primary start-end information list.

For example, referring to FIG. 8, Append-3 is performed to reappend the 70K data, which was not appended in failed Append-2. As Append-1 successfully adds 10K data, the size of the previous data stored in the data storage block Block D2#0 allocated the last time before the to-be-written data in Append-3 is acquired is 30K, which is less than the preset capacity of 64K. In this case, the 30K previous data can be reread and combined with 70K to-be-written data in Append-3. The combined data can be stored in data storage block Block D3.

With respect to writing data for which the user does not specify an append position, when the user commits to-be-written data, the user does not need to commit a requested position at the same time. For example, each time the written data of the user is acquired, and after the written data is appended to the existing data file, when there is concurrent to-be-written data, a distributed system acquires the total length of the current data file, and sequentially combines all received data blocks into the data file according to an order of received requests. Continuing with the foregoing example, it is assumed that there are written data A, written data B, and written data C. An existing data file in a distributed system includes data A and B, and the user concurrent writes data C. When the user concurrently uploads two pieces of data C, and after one of the two pieces of to-be-written data C is successfully written, the total length of the data file changes. The second piece of to-be-written data C fails to be written the first time. In this case, the total length of the data file is reacquired for appending the second piece of to-be-written data C, and another attempt is made and the write is successful. The two pieces of data C that are concurrently uploaded are sequentially written in the data file. Eventually the data file includes A, B, C, and C. The solutions in which the user does not specify an append position are suitable for scenarios where an order of appended data is of no concern, for example, collection of program logs in a distributed environment.

It is appreciated that the foregoing description of specific scenarios is only an example. Other manners can be applicable to the present application consistent with the present disclosure, which should also fall within the protection scope of the present application.

In some embodiments, the exemplary device 1100 can further include: a determination apparatus configured to determine whether a capacity of the primary start-end information list reaches a capacity threshold or a quantity of data start-end information thereof reaches a quantity threshold. When the capacity reaches the capacity threshold or the quantity reaches the quantity threshold, the determination apparatus is further configured to: transfer all data start-end information that are currently in the primary start-end information list to a secondary start-end information list; store the secondary start-end information list in a newly allocated secondary start-end information storage block; and store secondary start-end information generated based on the secondary start-end information storage block in the primary start-end information storage block.

In some embodiments, the exemplary device 1100 can further include: a grading apparatus configured to examine the primary start-end information storage block RootExtent-Block. If a capacity of the primary start-end information list reaches the capacity threshold or the quantity of data start-end information thereof reaches the quantity threshold, the grading apparatus can be further configure to: perform multi-level processing (Level Promotion), transfer all data start-end information that are currently in the primary start-end information list to a secondary start-end information list; store the secondary start-end information list in a newly allocated secondary start-end information storage block; and store secondary start-end information generated based on the secondary start-end information storage block in the primary start-end information storage block.

The above process is further described herein with reference to FIG. 9, which is a schematic diagram illustrating a process of writing data involving level promotion in a distributed storage system according to some embodiments of the present application. An objective of Level Promotion is to limit a size of the primary start-end information storage block RootExtentBlock, to effectively support a large file. For example, only data start-end information, that is, multiple pieces of start-end information Extent of Level 0, exists initially in the primary start-end information storage block RootExtentBlock. With reference to FIG. 9, when a quantity of the level 0 Extent exceeds a particular threshold (for example, 1024), and when the size of the primary start-end information storage block RootExtentBlock is greater than or equal to a capacity threshold BlockSize, a new storage block is allocated as a secondary start-end information storage block ExtentBlock EB-1. The secondary start-end information storage block ExtentBlock EB-1 stores the secondary start-end information list, including all the foregoing level 0 Extent. level 1 Extent is generated based on the secondary start-end information storage block ExtentBlock EB-1, and is stored in a newly allocated primary start-end information storage block RootExtentBlock EB-D. A data start address RangeStart of the primary start-end information storage block RootExtentBlock EB-D is a data start address RangeStart of the first data start-end information Extent included in the secondary start-end information storage block ExtentBlock EB-1, which is 0. A data end address RangeEnd of the primary start-end information storage block RootExtentBlock EB-D is a data end address RangeEnd of the last start-end information Extent included in the secondary start-end information storage block ExtentBlock EB-1. A secondary identification code ExtentID corresponding to the secondary start-end information storage block ExtentBlock EB-1 is EB-1.

In some embodiments, the exemplary device 1100 can further include: a buffer apparatus configured to set a primary start-end information storage block corresponding to the primary start-end information list before update to a read-only state. After the description file is successfully persisted, the buffer apparatus can be further configured to clear the primary start-end information storage block corresponding to the primary start-end information list before update. That is, when the device 1100 performs data writing, the primary start-end information storage block corresponding to the primary start-end information list before update is set to a read-only state; and after the description file is successfully persisted, the primary start-end information storage block corresponding to the primary start-end information list before update is cleared. For example, the primary start-end information storage block EB-B in FIG. 4 is set to a read-only state in the process of writing data in FIG. 5. After the primary start-end information storage block EB-C shown in FIG. 5 is updated and the updated description file FileInfo is persisted, the primary start-end information storage block EB-B is cleared. Similarly, the data storage block Block D1#0 shown in FIG. 3 can be cleared after the data storage blocks Block D2#0, D2#1, and D2#2 in FIG. 4 are stored and the updated description file FileInfo is persisted. The way, it can help achieve that when a user appends to-be-written data, a data file stored in a device can still provide a service of acquiring data.

It is appreciated that the foregoing description of specific scenarios is only an example. Other manners can be applicable to the present application, which should also fall within the protection scope of the present application.

In view of the above, with the exemplary device for writing data, a data file is not overwritten but is instead updated by making a copy in a newly allocated storage block, and the updated description file is persisted by using an atomic operation. Therefore, in a process of appending data, it can be ensured that a data file is not damaged, and the readability and consistency of data are maintained, facilitating the use by a user. Further, the above-described exemplary device for writing data can support a write in which a user specifies a write position of to-be-written data, and also support a write in which the user does not specify a write position of to-be-written data, thereby improving the flexibility of writing data by the user.

Figure 12:
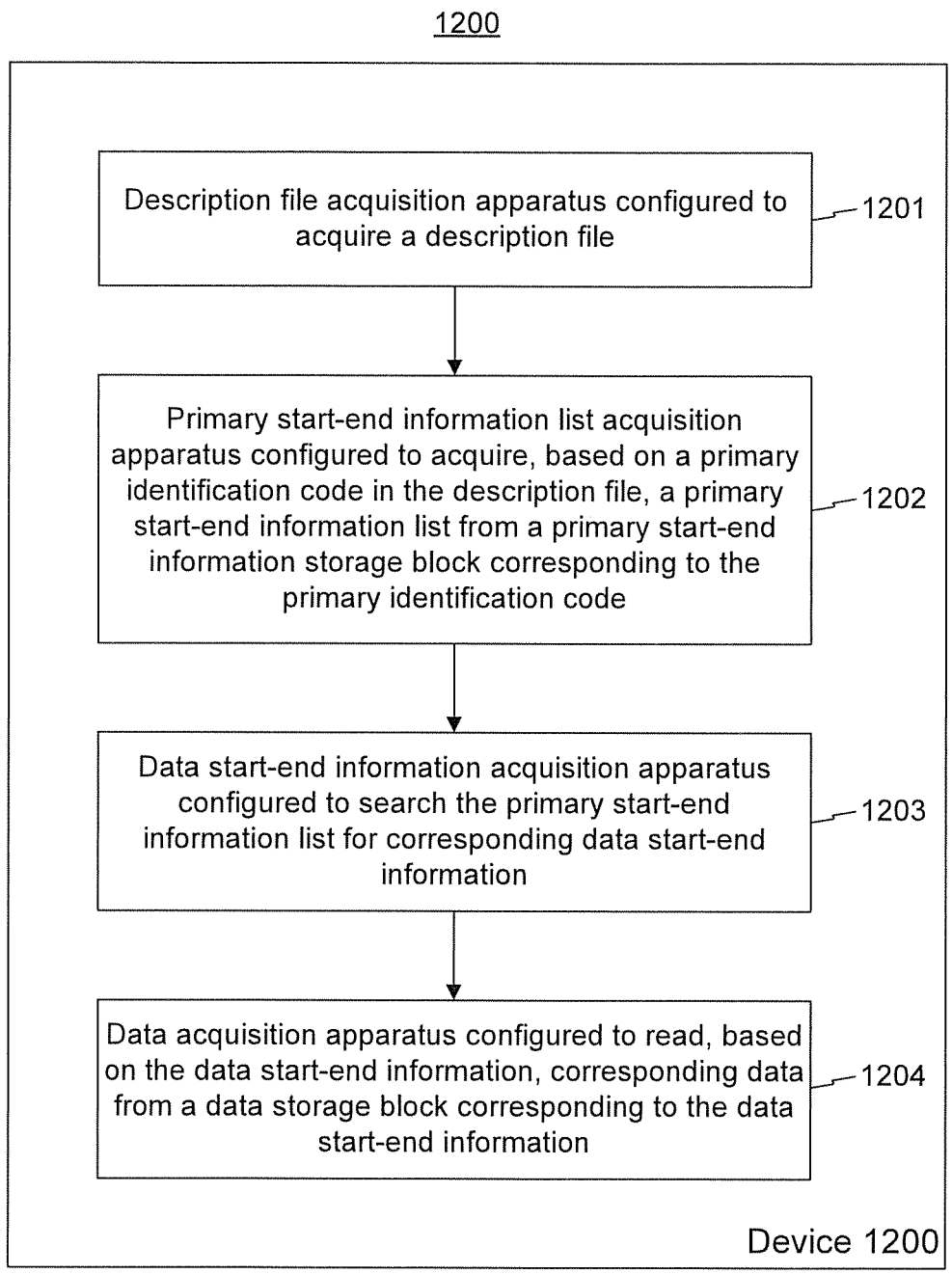
FIG. 12 is a schematic diagram of an exemplary device for acquiring data in a distributed storage system according to some embodiments of the present application.

FIG. 12 is a schematic diagram of an exemplary device 1200 for acquiring data in a distributed storage system according to some embodiments of the present application. The exemplary device 1200 can include a description file acquisition apparatus 1201, a primary start-end information list acquisition apparatus 1202, a data start-end information acquisition apparatus 1203, and a data acquisition apparatus 1204.

The description file acquisition apparatus 1201 can be configured to acquire a description file.

The primary start-end information list acquisition apparatus 1202 can be configured to acquire, based on a primary identification code in the description file, a primary start-end information list from a primary start-end information storage block corresponding to the primary identification code.

The data start-end information acquisition apparatus 13 can be configured to search the primary start-end information list for corresponding data start-end information.

The data acquisition apparatus 14 can be configured to read, based on the data start-end information, corresponding data from a data storage block corresponding to the data start-end information.

In some embodiments, when the primary start-end information list can further include secondary start-end information. Data start-end information acquisition apparatus 13 can be further configured to search, based on the secondary start-end information, a secondary start-end information storage block corresponding to the secondary start-end information for the corresponding data start-end information. For example, binary search can be used to search for the corresponding data start-end information.

In some embodiments, the exemplary device 1200 can be, but is not limited to, a network device or a device that is formed by integrating user equipment and a network device via a network. The network device can include an electronic device that can automatically perform numerical computation and information processing according to a set of instruction stored in advance. Hardware of the network device can include, but is not limited to, a microprocessor, an application-specific integrated circuit (ASIC), a field-programmable gate array (FPGA), a digital signal processor (DSP), and an embedded device. The network device can be, but is not limited to, a computer, a network host, a single network server, multiple network server sets or a cloud that is formed of multiple servers. Here, the cloud can be formed of a large number of computers or network servers that are based on cloud computing. The cloud computing is one type of distributed computing, and can be a virtual supercomputer formed by a group of loosely coupled computer sets. The network can include, but is not limited to, the Internet, a wide area network, a metropolitan area network, a local area network, a VPN network, and a wireless Ad Hoc network. In some embodiments, device 1200 may further be in the form of a script program that can be operated on the network device or a device that is formed by integrating the user equipment and the network device or the network device and a touch terminal via a network. It should be appreciated that the foregoing device 1200 is only exemplary. Other devices can be applicable to the present application consistent with the present disclosure, which should also fall within the protection scope of the present application. In addition, the above-described exemplary device 1200 and device 1100 may be disposed together in one device.

The foregoing apparatuses described with reference to FIG. 12 can work and interact with each other continuously. Here, a person skilled in the art should understand "continuously" means that the foregoing apparatuses work separately in real time or according to a working mode requirement that is set or is adjusted in real time. With the devices for acquiring data according to some embodiments of the present application, on the basis of the written data, data can be acquired in time for a user to read and can be read at any time without being affected by the written data, thereby facilitating the use by the user.

It should be appreciated that embodiments of the present application may be implemented in software and/or a combination of software and hardware, for example, implemented by using an application-specific integrated circuit (ASIC), a general-purpose computer or any other similar hardware device. In one embodiment, the software program of the present application may implement the foregoing steps or functions through execution of a processor. Similarly, the software program (including a related data structure) of the present application may be stored in a computer readable recording medium, for example, a RAM, a magnetic drive or an optical drive or a floppy disk or a similar device. In addition, some steps or functions of the present application may be implemented by using hardware, for example, a circuit that is combined with a processor to execute the steps or functions.

For example, functional units/apparatuses in some embodiments of the present application may be integrated into one or more processing units, or each of the units may exist alone physically, or two or more units are integrated into one unit. The integrated unit may be implemented in the form of hardware, and/or may be implemented in the form of a software function unit. The integrated unit implemented in the form of a software functional unit may be stored in a computer-readable storage medium. The software functional unit can be stored in a storage medium, which includes a set of instructions for instructing a computer device (which may be a personal computer, a server, a network device, a mobile device, or the like) or a processor to perform a part of the steps of the methods described in the embodiments of the present application. The foregoing storage medium may include, for example, any medium that can store a program code, such as a USB flash disk, a removable hard disk, a Read-Only Memory (ROM), a Random Access Memory (RAM), a magnetic disk, or an optical disc. The storage medium can be a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM any other memory chip or cartridge, and networked versions of the same.

Further, some embodiments of the present application may be implemented as a computer program product, for example, in the form of a set of computer program instructions. When being executed by a computer, the computer program instructions may invoke or provide the methods and/or technical solutions according to the present application through the operation of the computer. The program instructions that invoke the method of the present application may be stored in a fixed or removable recording medium, and/or can be transmitted through broadcasting or by using a data stream in another signal-bearing medium, and/or stored in a working memory of a computer device that runs according to the program instructions. For example, some embodiments of to the present application include one or more apparatuses. The apparatuses can include a memory configured to store computer program instructions and a processor configured to execute the program instructions. When the computer program instructions are executed by the processor, the apparatuses can be triggered to run the methods and/or technical solutions based on the foregoing description.

It should be appreciated that the present application is not limited to the description in the foregoing exemplary embodiments, and the present application can be implemented in other specific forms without departing from the spirit or basic features of the present application. Therefore, the above examples should be considered to be exemplary and non-limitative. The scope of the present application is defined by the appended claims instead of the foregoing description. All changes and modifications that fall within the spirit and scope of the present application and equivalent elements thereof are covered by the present application. Any reference numeral in the claims should not be construed as limiting the related claims. In addition, the word "include" does not exclude other units or steps, and a singular form does not exclude a plural one. Multiple units or apparatuses described in the apparatus claims may alternatively be implemented by one unit or apparatus through software and/or hardware. Terms such as "first" and "second," and the like shall not be considered to refer to a specific order.

The principles and implementation manners of the present application are described by using the examples herein. The above description regarding certain embodiments is merely used to facilitate understanding of the present application. It should be appreciated that a person skilled in the art may make various modifications and variations without departing from the spirit and scope of the present application. These modifications and variations and the equivalents thereof shall all fall within the scope of the present application, which is defined in the claims of the application.

The invention claimed is:

1. A method for writing data in a distributed storage system, comprising:
    storing to-be-written data in a data storage block;
    updating a primary start-end information list based on data start-end information about the data storage block;
    storing the updated primary start-end information list in a primary start-end information storage block;
    generating a primary identification code based on the primary start-end information storage block;
    updating a description file based on the primary identification code and a total length of a data file after the to-be-written data is added; and
    persisting the updated description file by using an atomic operation.

2. The method according to claim 1, wherein storing the to-be-written data in the data storage block comprises:
    determining whether a size of previous data stored in a data storage block allocated the last time before the to-be-written data is acquired is less than a preset capacity; and
    in response to the determination that the size is less than the preset capacity, performing a penalty reading operation, which comprises:
        combining the previous data and the to-be-written data, and
        storing the combined data in the data storage block.

3. The method according to claim 2, further comprising:
    acquiring a requested position of the to-be-written data before the to-be-written data is acquired;
    determining whether the requested position is consistent with a total length of a current data file; and
    acquiring the to-be-written data, in response to the determination that the requested position is consistent with the total length.

4. The method according to claim 2, further comprising:
    acquiring a file length of the data file before the to-be-written data is acquired; and
    wherein updating the description file based on the primary identification code and the total length of the data file obtained after the to-be-written data is added comprises:
        determining, using a file length of a data file acquired before the to-be-written data is acquired as a requested position of the to-be-written data, whether the requested position is consistent with a total length of a current data file, and
        updating, in response to the determination that the requested position is consistent with the total length of the current data file, the description file based on the primary identification code and the total length of the data file obtained after the to-be-written data is added.

5. The method according to claim 4, wherein updating the description file based on the primary identification code and the total length of the data file obtained after the to-be-written data is added further comprises:
    determining, in response to the determination that the requested position is inconsistent with the total length of the current data file, whether the penalty reading operation exists; and
    in response to the determination that the penalty reading operation exists, determining whether a size of previous data stored in a data storage block allocated the last time before the to-be-written data is acquired is less than the preset capacity, and
        performing, when the size is less than the preset capacity, the penalty reading operation, which comprises:
            combining the previous data and the to-be-written data, and storing the combined data in the data storage block, or
        storing, when the size is greater than or equal to the preset capacity, the to-be-written data in the data storage block again; and
    in response to the determination that the penalty reading operation does not exist:
        reacquiring the total length of the data file,
        determining, using the reacquired total length of the data file as a requested position of the to-be-written data, whether the requested position is consistent with the total length of the current data file, and
        updating, in response to the determination that the requested position is consistent with the total length, the description file based on the primary identification code and the total length of the data file obtained after the to-be-written data is added.

6. The method according to claim 1, further comprising:
    determining whether a capacity of the primary start-end information list reaches a capacity threshold or a quantity of data start-end information thereof reaches a quantity threshold, and in response to the determination that the capacity reaches the capacity threshold or the quantity reaches the quantity threshold:
        transferring data start-end information in the primary start-end information list to a secondary start-end information list,
        storing the secondary start-end information list in a secondary start-end information storage block, and
        storing secondary start-end information generated based on the secondary start-end information storage block in the primary start-end information storage block.

7. The method according to claim 1, further comprising:
    setting a primary start-end information storage block corresponding to the primary start-end information list before update to a read-only state; and
    clearing, after the description file is persisted, the primary start-end information storage block corresponding to the primary start-end information list before update.

8. The method according to claim 1, wherein the data storage block comprises one or more unit storage blocks having the same capacity.

9. The method according to claim 1, wherein the data start-end information comprises at least any one of the following:
    an identification code of the data storage block;
    start-end address information of data in the data storage block; and
    a number of unit storage blocks in the data storage block.

10. The method according to claim 1, further comprising:
acquiring the description file;
acquiring, based on the primary identification code in the description file, the primary start-end information list from the primary start-end information storage block corresponding to the primary identification code;
searching the primary start-end information list for corresponding data start-end information; and
reading, based on the data start-end information, corresponding data from the data storage block corresponding to the data start-end information.

11. The method according to claim 10, wherein when the primary start-end information list comprises secondary start-end information, searching the primary start-end information list for corresponding data start-end information further comprises:
searching, based on the secondary start-end information, a secondary start-end information storage block corresponding to the secondary start-end information for the corresponding data start-end information.

12. The method according to claim 10, wherein searching the primary start-end information list for corresponding data start-end information comprises:
searching for the corresponding data start-end information by using binary search.

13. A device for writing data in a distributed storage system, comprising:
a writing apparatus configured to store to-be-written data in a data storage block;
a start-end information update apparatus configured to update a primary start-end information list based on data start-end information about the data storage block, and store the updated primary start-end information list in a primary start-end information storage block;
a primary identification code update apparatus configured to generate a primary identification code based on the primary start-end information storage block; and
a description file update apparatus configured to update a description file based on the primary identification code and a total length of a data file obtained after the to-be-written data is added, and persist the updated description file by using an atomic operation.

14. The device according to claim 13, further comprising:
a description file acquisition apparatus configured to acquire the description file;
a primary start-end information list acquisition apparatus configured to acquire, based on the primary identification code in the description file, the primary start-end information list from the primary start-end information storage block corresponding to the primary identification code;
a data start-end information acquisition apparatus configured to search the primary start-end information list for corresponding data start-end information; and
a data acquisition apparatus configured to read, based on the data start-end information, corresponding data from the data storage block corresponding to the data start-end information.

15. A non-transitory computer readable medium that stores a set of instructions, which are executable by at least one processor of a computer to perform a method for writing data in a distributed storage system, the method comprising:
storing to-be-written data in a data storage block;
updating a primary start-end information list based on data start-end information about the data storage block, and storing the updated primary start-end information list in a primary start-end information storage block;
generating a primary identification code based on the primary start-end information storage block; and
updating a description file based on the primary identification code and a total length of a data file after the to-be-written data is added, and persisting the updated description file by using an atomic operation.

16. The non-transitory computer-readable medium according to claim 15, wherein storing the to-be-written data in a data storage block comprises:
determining whether a size of previous data stored in a data storage block allocated the last time before the to-be-written data is acquired is less than a preset capacity; and
in response to the determination that the size is less than the preset capacity, performing a penalty reading operation, which comprises:
combining the previous data and the to-be-written data, and
storing the combined data in the data storage block.

17. The non-transitory computer-readable medium 16, wherein the set of instructions that is executable by the at least one processor of the computer causes the computer to further perform:
acquiring a requested position of the to-be-written data before the to-be-written data is acquired;
determining whether the requested position is consistent with a total length of a current data file; and
acquiring the to-be-written data, in response to the determination that the requested position is consistent with the total length.

18. The non-transitory computer-readable medium 16, wherein the set of instructions that is executable by the at least one processor of the computer causes the computer to further perform:
acquiring a file length of the data file before the to-be-written data is acquired; and
wherein updating the description file based on the primary identification code and the total length of the data file obtained after the to-be-written data is added comprises:
determining, using a file length of a data file acquired before the to-be-written data is acquired as a requested position of the to-be-written data, whether the requested position is consistent with a total length of a current data file; and
updating, in response to the determination that the requested position is consistent with the total length of the current data file, the description file based on the primary identification code and the total length of the data file obtained after the to-be-written data is added.

19. The non-transitory computer-readable medium according to claim 18, wherein updating the description file based on the primary identification code and the total length of the data file obtained after the to-be-written data is added further comprises:
determining, in response to the determination that the requested position is inconsistent with the total length of the current data file, whether the penalty reading operation exists; and
in response to the determination that the penalty reading operation exists, determining whether a size of previous data stored in a data storage block allocated the last time before the to-be-written data is acquired is less than the preset capacity, and
performing, when the size is less than the preset capacity, the penalty reading operation, which comprises:

combining the previous data and the to-be-written data, and storing the combined data in the data storage block, or storing, when the size is greater than or equal to the preset capacity, the to-be-written data in the data storage block again; and in response to the determination that the penalty reading operation does not exist:

reacquiring the total length of the data file, determining, using the reacquired total length of the data file as a requested position of the to-be-written data, whether the requested position is consistent with the total length of the current data file, and updating, in response to the determination that the requested position is consistent with the total length, the description file based on the primary identification code and the total length of the data file obtained after the to-be-written data is added.

20. The non-transitory computer-readable medium according to claim 15, wherein the set of instructions that is executable by the at least one processor of the computer causes the computer to further perform:

determining whether a capacity of the primary start-end information list reaches a capacity threshold or a quantity of data start-end information thereof reaches a quantity threshold, and in response to the determination that the capacity reaches the capacity threshold or the quantity reaches the quantity threshold:

transferring data start-end information in the primary start-end information list to a secondary start-end information list, storing the secondary start-end information list in a secondary start-end information storage block, and storing secondary start-end information generated based on the secondary start-end information storage block in the primary start-end information storage block.

21. The non-transitory computer-readable medium according to claim 15, wherein the set of instructions that is executable by the at least one processor of the computer causes the computer to further perform:

setting a primary start-end information storage block corresponding to the primary start-end information list before update to a read-only state; and clearing, after the description file is persisted, the primary start-end information storage block corresponding to the primary start-end information list before update.

22. The non-transitory computer-readable medium according to claim 15, wherein the data storage block comprises one or more unit storage blocks having the same capacity.

23. The non-transitory computer-readable medium according to claim 15, wherein the data start-end information comprises at least any one of the following:

an identification code of the data storage block;

start-end address information of data in the data storage block; and a number of unit storage blocks in the data storage block.

24. The non-transitory computer readable medium according to claim 15, wherein the set of instructions that is executable by the at least one processor of the computer causes the computer to further perform:

acquiring the description file;

acquiring, based on the primary identification code in the description file, the primary start-end information list from the primary start-end information storage block corresponding to the primary identification code;

searching the primary start-end information list for corresponding data start-end information; and reading, based on the data start-end information, corresponding data from the data storage block corresponding to the data start-end information.

25. The non-transitory computer readable medium according to claim 24, wherein when the primary start-end information list comprises secondary start-end information, in searching the primary start-end information list for corresponding data start-end information, the set of instructions that is executable by the at least one processor of the computer causes the computer to further perform:

searching, based on the secondary start-end information, a secondary start-end information storage block corresponding to the secondary start-end information for the corresponding data start-end information.

26. The non-transitory computer readable medium according to claim 24, wherein in searching the primary start-end information list for corresponding data start-end information, the set of instructions that is executable by the at least one processor of the computer causes the computer to further perform:

searching for the corresponding data start-end information by using binary search.

* * * * *